(12) United States Patent
Flores

(10) Patent No.: US 9,223,999 B2
(45) Date of Patent: *Dec. 29, 2015

(54) MANAGEMENT OF DIGITAL INFORMATION

(71) Applicant: International Business Machines Corporation, Armonk, NY (US)

(72) Inventor: Paul A. Flores, Rio Rancho, NM (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/480,724

(22) Filed: Sep. 9, 2014

(65) Prior Publication Data

US 2015/0026821 A1    Jan. 22, 2015

Related U.S. Application Data

(63) Continuation of application No. 13/784,025, filed on Mar. 4, 2013.

(51) Int. Cl.
  G06F 7/04      (2006.01)
  G06F 21/62     (2013.01)
  G06F 21/60     (2013.01)

(52) U.S. Cl.
  CPC .............. *G06F 21/62* (2013.01); *G06F 21/602* (2013.01); *G06F 21/6209* (2013.01); *G06F 2221/2107* (2013.01)

(58) Field of Classification Search
  CPC .......................... G06F 21/10; G11B 20/00086
  USPC ..................................................... 726/26–30
  See application file for complete search history.

(56) References Cited

U.S. PATENT DOCUMENTS

| | | | |
|---|---|---|---|
| 6,598,161 B1 | 7/2003 | Kluttz et al. | |
| 7,346,160 B2 | 3/2008 | Michaelsen | |
| 7,669,051 B2 | 2/2010 | Redlich et al. | |
| 8,655,939 B2* | 2/2014 | Redlich et al. | 709/201 |
| 2003/0156715 A1 | 8/2003 | Reeds, III et al. | |
| 2004/0091114 A1 | 5/2004 | Carter et al. | |
| 2007/0154018 A1 | 7/2007 | Watanabe | |
| 2008/0083036 A1 | 4/2008 | Ozzie et al. | |
| 2008/0162949 A1* | 7/2008 | Sato et al. | 713/194 |
| 2009/0147958 A1 | 6/2009 | Calcaterra et al. | |
| 2010/0138669 A1 | 6/2010 | Kursawe et al. | |
| 2010/0266120 A1 | 10/2010 | Leggette et al. | |
| 2011/0182424 A1 | 7/2011 | Grube et al. | |
| 2011/0246787 A1 | 10/2011 | Farrugia et al. | |
| 2012/0198241 A1 | 8/2012 | O'Hare et al. | |
| 2012/0255035 A1 | 10/2012 | Orsini et al. | |

OTHER PUBLICATIONS

PCT International Search Report and Written Opinion, PCT/IB2014/058898, Jun. 13, 2014, 11 pages.

* cited by examiner

*Primary Examiner* — Anthony Brown
(74) *Attorney, Agent, or Firm* — Farrokh Pourmirzaie; SVL IPLaw

(57) ABSTRACT

According to an embodiment of the present invention, a system provides secure access to a digital item and includes at least one processor. The system partitions the digital item into a plurality of segments each containing a portion of the digital item and associated with a corresponding sensitivity level. The portion of the digital item within each segment is encrypted in accordance with the corresponding sensitivity level, and the plurality of segments are randomly stored among a plurality of storage units. Embodiments of the present invention further include a method and computer program product for providing secure access to a digital item in substantially the same manner described above.

8 Claims, 23 Drawing Sheets

MANAGEMENT OF DIGITAL INFORMATION

CROSS-REFERENCE TO RELATED APPLICATIONS

This application is a continuation of U.S. patent application Ser. No. 13/784,025, entitled "MANAGEMENT OF DIGITAL INFORMATION" and filed Mar. 4, 2013, the disclosure of which is incorporated herein by reference in its entirety.

BACKGROUND

1. Technical Field

Present invention embodiments relate to management of digital information, and more specifically, to storage of digital artifacts or items and controlling and tracking access of the stored digital artifacts.

2. Discussion of the Related Art

Currently, numerous artifacts may reside in encrypted files stored on secure servers. The use of a secure server is analogous in several ways to a bank vault containing safe deposit boxes. Once access is obtained into the bank vault, the safe deposit boxes are accessible. Although the contents of each safe deposit box are not readily apparent, the fact that the safe deposit boxes are stored in a vault implicitly renders their contents valuable.

When a secure server is compromised, the method employed by the secure server to track disk allocation and files can be exploited to identify and find artifacts within the compromised secure server. In this case, the last level of defense to safeguard the contents of an artifact is the encryption strategy used to store the artifact contents. However, even this last level of defense presents a potential weakness since an identified artifact becomes a target for a focused attack to defeat the encryption strategy.

Further, the eventual or required disclosure of contents of an artifact may require redacting. The process of redacting contents of sensitive artifacts can lead to an inadvertent disclosure of sensitive information. For example, the redaction process may leave enough information of the artifact to infer sensitive contents.

In addition, tracking the source of a disclosure of content of an artifact is difficult. In particular, once the content of an artifact has been disclosed, identifying the manner in which access to the artifact was obtained and determining the person responsible for the disclosure is complex. In order to ascertain authenticity of an artifact, artifact identifiers must be clearly disclosed which can present even further issues.

BRIEF SUMMARY

According to an embodiment of the present invention, a system provides secure access to a digital item and includes at least one processor. The system partitions the digital item into a plurality of segments each containing a portion of the digital item and associated with a corresponding sensitivity level. The portion of the digital item within each segment is encrypted in accordance with the corresponding sensitivity level, and the plurality of segments are randomly stored among a plurality of storage units. Embodiments of the present invention further include a method and computer program product for providing secure access to a digital item in substantially the same manner described above.

BRIEF DESCRIPTION OF THE SEVERAL VIEWS OF THE DRAWINGS

Generally, like reference numerals in the various figures are utilized to designate like components.

DETAILED DESCRIPTION

Figure 1:
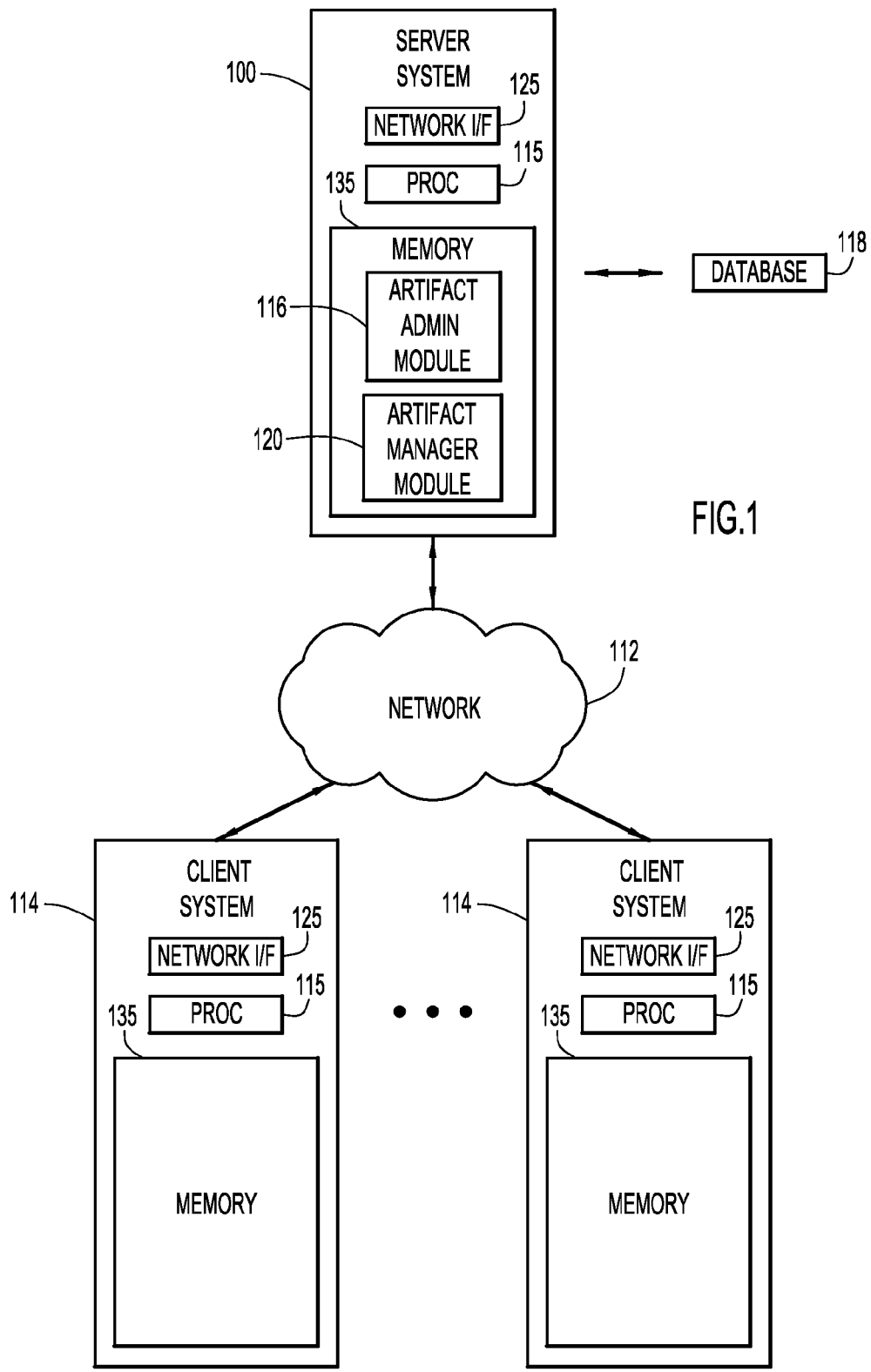
FIG. 1 is a diagrammatic illustration of an example computing environment of an embodiment of the present invention.

An embodiment of the present invention provides an artifact management system that securely stores digital items or artifacts containing content. The artifact is stored in a manner to render unauthorized retrieval extremely difficult, while being able to track specific artifact access requests. The contents of an artifact include varying degrees of sensitivity (or confidentiality). Relationships between elements of the artifact content determine the sensitivity of the overall artifact. Thus, elements of an artifact may reside at different levels of sensitivity.

A dimensional view or perspective of artifacts is based on contextual sensitivity. A lowest level of contextual sensitivity provides a structural foundation for the entire artifact. Subsequent levels of contextual sensitivity define alternative or augmented structures within an artifact, but do not necessarily redefine or restructure the entire artifact. Accordingly, each layer of contextual sensitivity overlays or augments a lower level providing additional contextual content. In this perspective, an artifact is compiled at the lowest level of sensitivity. Subsequent levels of sensitivity overlay or augment the contents of lesser levels of contextual sensitivity, thereby facilitating artifact segmentation including random segment dispersal. The concept of segment dispersal is analogous to shredding a document into a number of pieces, shuffling those pieces, and dispersing the individual pieces into a number of containers with similar but unrelated pieces.

The artifact segmentation concept relies on the characteristic of the segment. A segment of present invention embodiments includes a unit of storage and a unit of reconsolidation. Each segment includes elements that identify the appropriate contextual level and the next segment, where the last segment of an artifact includes a pointer indicating the first segment of that artifact. The segmentation of present invention embodiments allows for differing levels of encryption to be employed within an artifact to further safeguard the contents. In addition, aspects of segmentation allow for tracking artifact access authorizations.

Present invention embodiments provide a significant increase in the ability to safeguard digitally stored artifacts or items, and to track and manage access to those stored artifacts. In particular, present invention embodiments actively hide or obscure the artifact. The number of artifacts, artifact size, and storage locations are all obscured. The artifacts are segmented along defined contextual dimensions, and stored as records in plural randomly named files or tables along with generated data, preferably based on size. Further, an artifact description and definition reside within an artifact information model. The artifact information model provides a description and definition of the manner in which the artifact is structured. The overall artifact structure is context driven to enable an artifact to include plural contextual dimensions each reflecting a different level of information sensitivity (or confidentiality).

In addition, present invention embodiments identify critical information regarding artifact access. Task specific modules are provided to assist in the prevention of disclosure. For example, a consolidation module is employed to consolidate or arrange artifact segments. Moreover, artifact access points are utilized for tracking artifact access. An artifact access point is a portion of an artifact that is obscured, varies among the artifacts, and yet is traceable to identify a user accessing an artifact. An artifact access point indicates an entry location for an associated user within the artifact in order to retrieve the artifact for viewing, printing, or other operations. The artifact access points are generated by the artifact management system. The artifact access points are arbitrarily assigned to users by the artifact management system in response to a user request or registration, and typically lapse upon expiration of a corresponding time interval. The time intervals may vary based on the user role and/or authorized sensitivity level.

An example computing environment for an artifact management system of a present invention embodiment is illustrated in FIG. 1. Specifically, the computing environment includes a server system 100, and one or more client or end-user systems 114. Server system 100 and client systems 114 may be remote from each other and communicate over a network 112. The network may be implemented by any number of any suitable communications media (e.g., wide area network (WAN), local area network (LAN), Internet, Intranet, etc.). Alternatively, server system 100 and client systems 114 may be local to each other, and communicate via any appropriate local communication medium (e.g., local area network (LAN), hardwire, wireless link, Intranet, etc.).

Client systems 114 enable users to interact with server system 100 to manage digital items or artifacts. The server system includes an artifact administration module 116 to handle administrative tasks (e.g., establishing various user roles, artifact properties, access properties, etc.), and an artifact manager module 120 to manage (e.g., create, store, retrieve, control and track access, etc.) the digital artifacts or items. A database system 118 may store various information for the artifact management (e.g., artifacts and corresponding elements, user roles, access points, etc.). The database system may be implemented by any conventional or other database or storage unit, may be local to or remote from server system 100 and client systems 114, and may communicate via any appropriate communication medium (e.g., local area network (LAN), wide area network (WAN), Internet, hardwire, wireless link, Intranet, etc.). The client systems may present one or more graphical user (e.g., GUI, etc.) or other interfaces (e.g., command line prompts, menu screens, etc.) to solicit information from users pertaining to the desired artifacts, and may provide various reports (e.g., artifact access, users and corresponding roles, artifact properties, etc.).

Server system 100 and client systems 114 may be implemented by any conventional or other computer systems preferably equipped with a display or monitor, a base (e.g., including at least one processor 115, one or more memories 135 and/or internal or external network interfaces or communications devices 125 (e.g., modem, network cards, etc.)), optional input devices (e.g., a keyboard, mouse or other input device), and any commercially available and custom software (e.g., server/communications software, artifact administration module, artifact manager module, browser/interface software, etc.).

Artifact administration module 116 and artifact manager module 120 may include one or more modules or units to perform the various functions of present invention embodiments described below (e.g., consolidation module, role specific modules, set-up modules, etc.). The various modules (e.g., artifact administration module, artifact manager module, etc.) may be implemented by any combination of any quantity of software and/or hardware modules or units, and may reside within memory 135 of server system 100 for execution by processor 115.

Present invention embodiments employ multidimensional structures to enable artifact content to be defined, thereby enabling redaction of information (e.g., based on a sensitivity level of a user) to suit an origin of an information request. These structures store unique request origin tracking information within each artifact to identify points of information dissemination. Each dimension of the structure includes a structural reference or dimensional layer, a segment type, a context, segment content, and segment properties. A dimensional layer points to an access point that is a reference to a specific location within an artifact.

Figure 2:
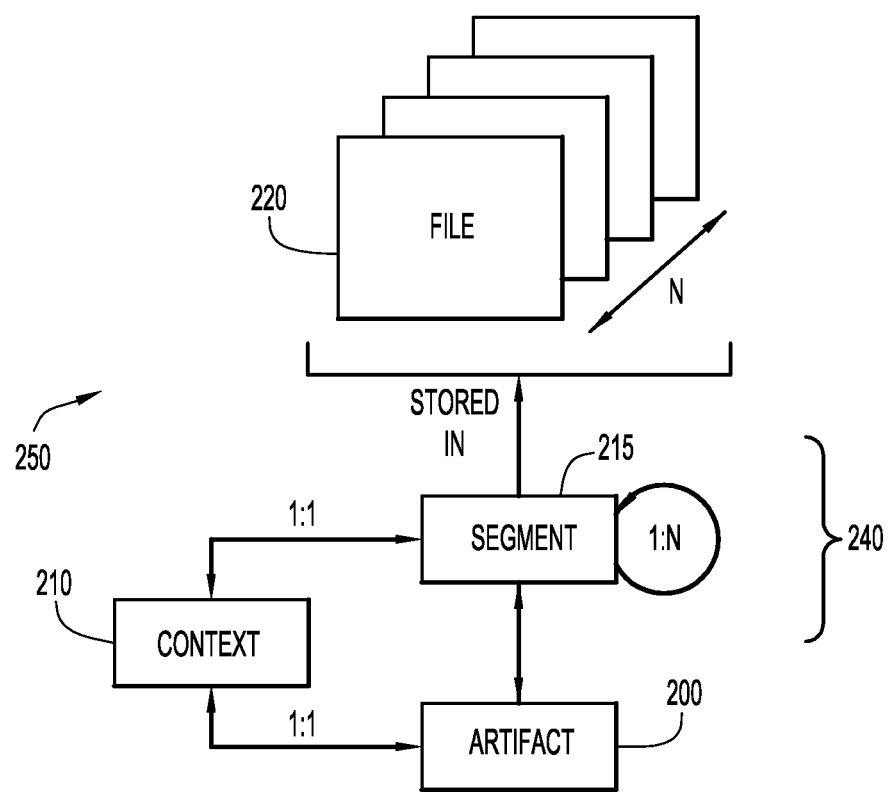
FIG. 2 is a diagrammatic illustration of an example manner of storing an artifact according to an embodiment of the present invention.

An example structure for storing an artifact or digital item according to an embodiment of the present invention is illustrated in FIG. 2. Specifically, an artifact structure 250 is based on an artifact information model 240. The artifact information model includes an artifact identifier 200, a context or sensitivity identifier 210, and one or more segments 215 each including content of the artifact. The artifact identifier provides a unique identifier for the artifact, while the context identifier indicates a context that refers to the sensitivity or confidentiality of contents of a corresponding artifact segment. An artifact may include any quantity of segments 215 (e.g., indicated by the "1:N" relationship as viewed in FIG. 2) each associated with a corresponding context or context identifier 210 (e.g., indicated by the "1:1" relationship as viewed in FIG. 2). Thus, the segments may be associated with the same or different contexts, thereby enabling varying sensitivities to be applied to different portions of the artifact.

Artifact segments 215 are stored in randomly chosen storage locations or files 220, preferably based on the sizes of the segments and files. By way of example, files 220 are implemented by segment storage tables within database 118 each containing segment records of segment information for various artifacts. However, files 220 may be implemented by any suitable storage structure (e.g., files, database tables or other objects, data structures, etc.). Each artifact segment includes a pointer to identify a next artifact segment, where the last segment of the artifact points back to an initial segment. An artifact is retrieved by utilizing the pointers to traverse the segments until an initial artifact segment is repeated. This enables the artifact to be completely and correctly assembled at final construction.

In certain instances, a file or table may be partially filled with artifact segments, or only contain segments with sensitive information. In these cases, additional segments are placed in the file or table (and artifact) to enhance obfuscation of the sensitive information. The additional segments include extraneous information or chaff from other sources (e.g., technical manuals, images, text, notices, open sources, etc.), and serve as a type of filler for the files or tables (and artifact). The chaff are arranged in an information model and segmented in a fashion similar to that of the artifact, thereby enabling retrieval of the chaff or filler segments with the artifact segments.

Figure 3:
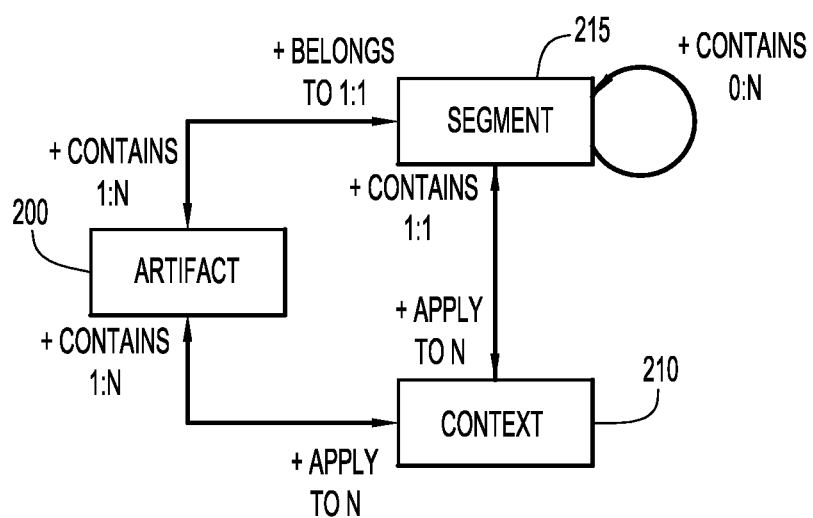
FIG. 3 is diagrammatic illustration of an information model for an artifact according to an embodiment of the present invention.

Referring to FIG. 3, artifact information model 240 includes artifact identifier 200, context or sensitivity identifier 210, and one or more segments 215 each including content of the artifact as described above. The artifact information model may be adapted to form information models that describe various types of digital artifacts or items. Artifact information model 240 preferably includes the following properties: an artifact may be associated with one or more contexts or context identifiers 210 (e.g., indicated by the "Contains 1:N" relationship as viewed in FIG. 3); a context or context identifier 210 may apply to any quantity of artifacts (e.g., indicated by the "Apply to N" relationship as viewed in FIG. 3); an artifact includes one or more segments 215 (e.g., indicated by the "Contains 1:N" relationship as viewed in FIG. 3); a segment 215 belongs to one artifact (e.g., indicated by the "Belong to 1:1" relationship as viewed in FIG. 3) and is associated with one context or context identifier 210 (e.g., indicated by the "Contains 1:1" relationship as viewed in FIG. 3); a context or context identifier 210 may apply to any quantity of segments 215 (e.g., indicated by the "Apply to N" relationship as viewed in FIG. 3); and a segment 215 may include zero or more segments (e.g., indicated by the "Contains 0:N" relationship as viewed in FIG. 3).

The following are example aspects of an artifact, where these aspects may be applied to different types of artifacts (e.g., documents, graphics, photographs, etc.): an artifact includes one or more titles; a title is associated with a context and can only be associated with an artifact with the same context; an artifact includes one or more descriptions; a description is associated with a context and can only be associated with an artifact with the same context; an artifact includes a creator block (e.g., including information for an originator of the artifact) that is associated with a context and can only be associated with an artifact with the same context; an artifact includes one or more context identifiers; and a context identifier is associated with a context and can only be associated with an artifact with the same context. Thus, an artifact may include more than one context identifier, where the context identifier reflects the specific context or sensitivity of the artifact or a corresponding portion (e.g., segment) thereof.

Example aspects associated with contexts include: a context has at most one description and one title; a context is associated with any quantity of context identifiers, where a context identifier is associated with one artifact; and each artifact element uses an associated context identifier in reference to a given context.

Figure 4:
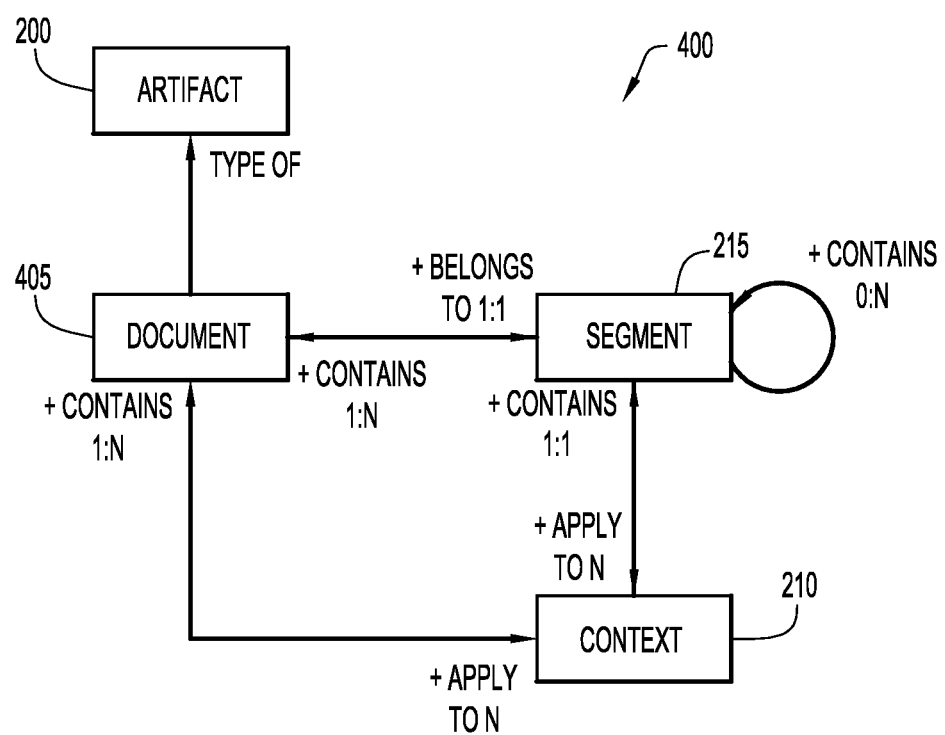
FIG. 4 is a diagrammatic illustration of an example information model for an artifact in the form of a document according to an embodiment of the present invention.

An example of an artifact information model for an artifact or digital item in the form of a document is illustrated in FIG. 4. This document information model inherits the properties and structure of artifact information model 240 (FIG. 3). Specifically, document information model 400 includes artifact identifier 200, a document element 405 indicating the type of artifact (e.g., a document), context or sensitivity identifier 210, and one or more segments 215 each including content of the document. Artifact identifier 200, context identifier 210, and segments 215 are substantially similar to the elements described above. The properties of the artifact information model described above apply to document information model 400, where document element 405 (or artifact type) has a similar relationship with context identifier 210 and segments 215 as artifact identifier 200. Each of the elements of the document information model represents a particular dimension that may be nested.

Figure 5:
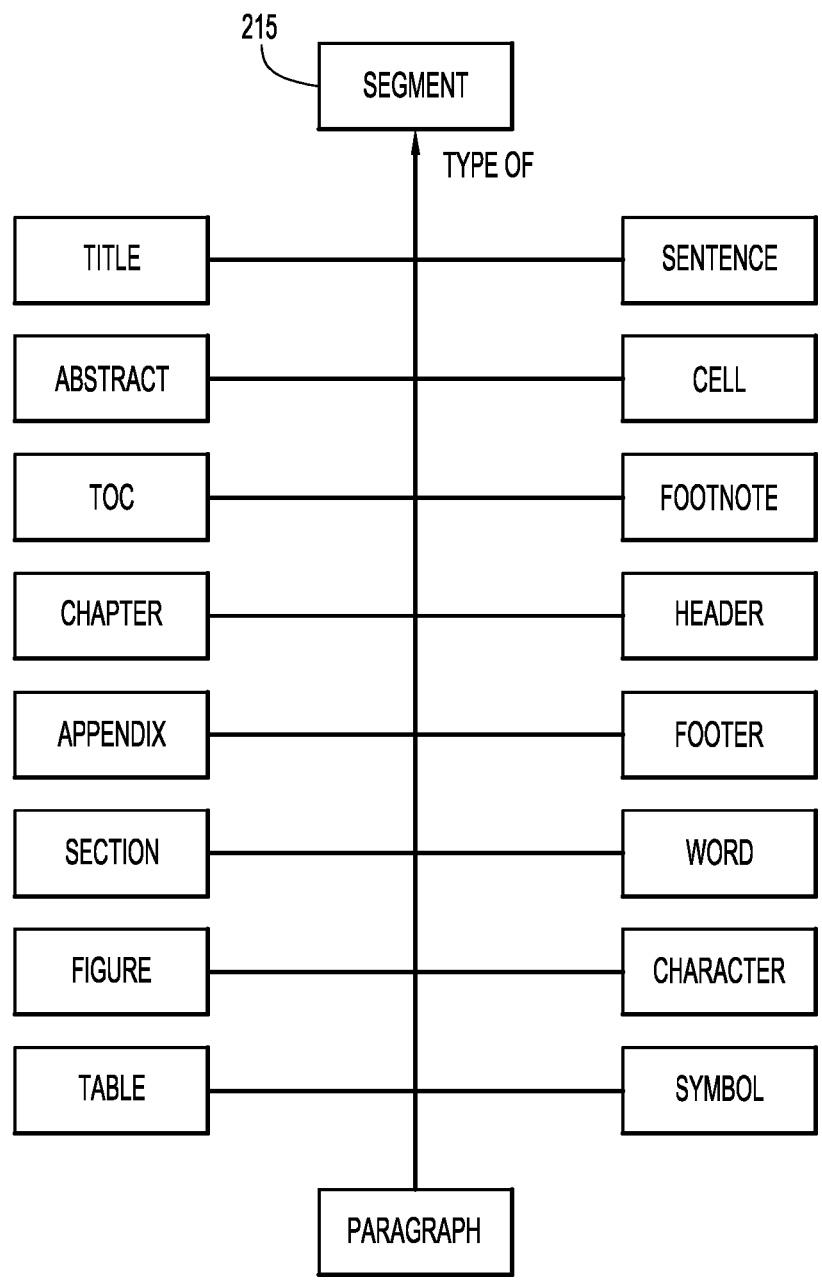
FIG. 5 is a diagrammatic illustration of various example segment types for a document information model according to an embodiment of the present invention.

FIG. 5 illustrates various example types of segments for a document artifact that are elements of the document information model. By way of example, the segment types include Title, Abstract, Table of Contents (TOC), Chapter, Appendix, Section, Figure, Table, Paragraph, Sentence, Cell, Footnote, Header, Footer, Word, Character, and Symbol.

Figure 6:
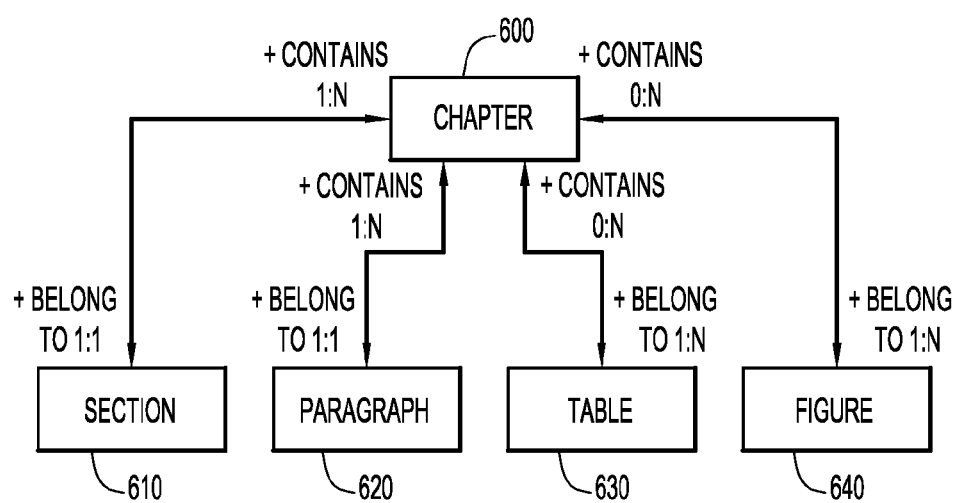
FIG. 6 is a diagrammatic illustration of example relationships for a chapter segment type of a document information model according to an embodiment of the present invention.

Various interrelationships may exist between segment types that define the artifact structure. For example, FIG. 6 illustrates relationships between segment types including a Chapter 600, a Section 610, a Paragraph 620, a Table 630, and a FIG. 640. In particular, Chapter 600 may include one or more Sections 610, one or more Paragraphs 620, zero or more Tables 630, and zero or more FIG. 640 (e.g., based on the "Contains" relationship as viewed in FIG. 6). Section 610 and Paragraph 620 may each belong to one Chapter 600, while Table 630 and FIG. 640 may each belong to one or more Chapters 600 (e.g., based on the "Belong to" relationship as viewed in FIG. 6).

Figure 7:
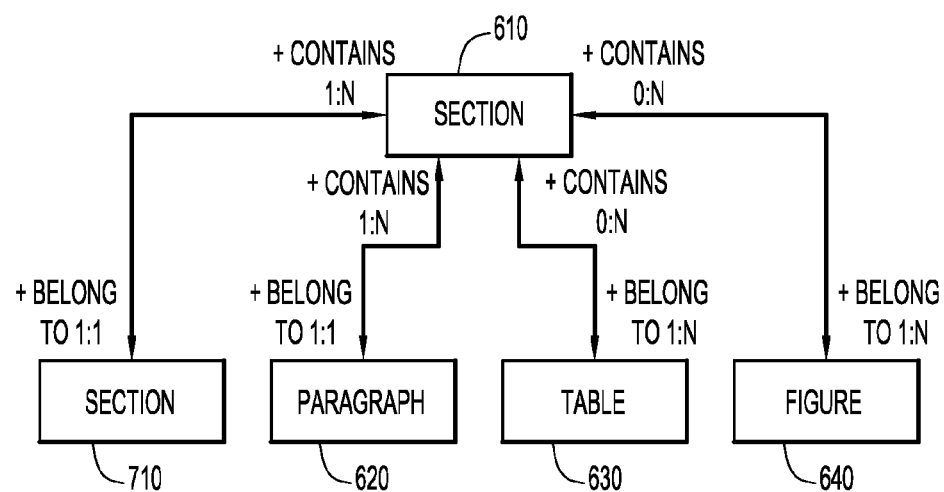
FIG. 7 is a diagrammatic illustration of example relationships for a section segment type of a document information model according to an embodiment of the present invention.

FIG. 7 illustrates example relationships between segment types including Section 610, a Section 710, Paragraph 620, Table 630, and FIG. 640. In particular, Section 610 may include one or more Sections 710, one or more Paragraphs 620, zero or more Tables 630, and zero or more FIG. 640 (e.g., based on the "Contains" relationship as viewed in FIG. 7). Section 710 and Paragraph 620 may each belong to one Section 610, while Table 630 and FIG. 640 may each belong to one or more Sections 610 (e.g., based on the "Belong to" relationship as viewed in FIG. 7).

Figure 8:
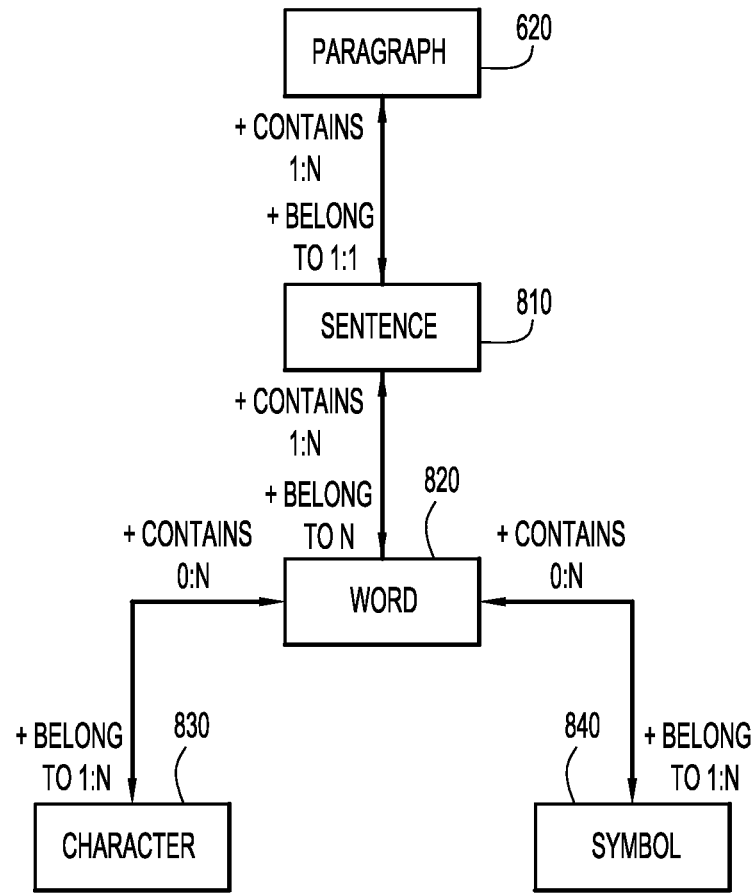
FIG. 8 is a diagrammatic illustration of example relationships for a paragraph segment type of a document information model according to an embodiment of the present invention.

FIG. 8 illustrates example relationships between segment types including Paragraph 620, a Sentence 810, a Word, 820, a Character 830, and a Symbol 840. In particular, Paragraph 620 may include one or more Sentences 810, while Sentence 810 may include one or more Words 820 (e.g., based on the "Contains" relationship as viewed in FIG. 8). Word 820 may include zero or more Characters 830 and zero or more Symbols 840 (e.g., based on the "Contains" relationship as viewed in FIG. 8). Sentence 810 may belong to one Paragraph 620, while Word 820 may belong to one or more Sentences 810 (e.g., based on the "Belong to" relationship as viewed in FIG. 8). In addition, Character 830 and Symbol 840 may each belong to one or more Words 810 (e.g., based on the "Belong to" relationship as viewed in FIG. 8).

Figure 9:
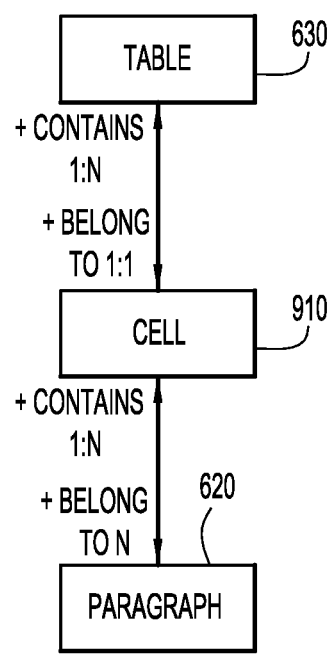
FIG. 9 is a diagrammatic illustration of example relationships for a table segment type of a document information model according to an embodiment of the present invention.

FIG. 9 illustrates example relationships between segment types including Table 630, a Cell 910, and Paragraph 620. In particular, Table 630 may include one or more Cells 910, while Cell 910 may include one or more Paragraphs 620 (e.g., based on the "Contains" relationship as viewed in FIG. 9). Cell 910 may belong to one Table 630, while Paragraph 620 may belong to one or more Cells 910 (e.g., based on the "Belong to" relationship as viewed in FIG. 9).

Present invention embodiments obfuscate the contents of a digital artifact or item to insure secure storage and to control access, and employ a multidimensional approach with an artifact information model that represents dimensions. By way of example, a document artifact may be stored utilizing the document information model. The document segments of the model represent storage dimensions, where a storage dimension is a reference to an artifact segment storage location.

Figure 10:
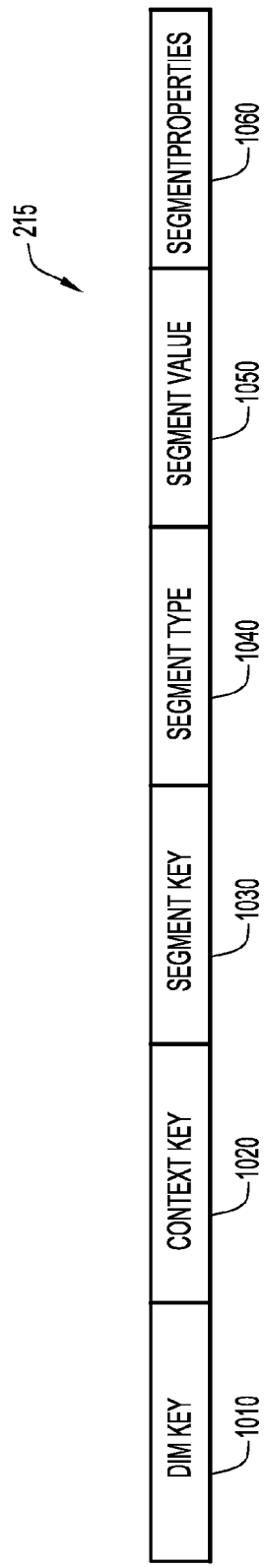
FIG. 10 is a diagrammatic illustration of an example artifact segment according to an embodiment of the present invention.

An example structure of an artifact segment is illustrated in FIG. 10. In particular, artifact segment 215 includes a dimension key field 1010, a context key field 1020, a segment key field 1030, a segment type field 1040, a segment value field 1050, and a segment properties field 1060. Dimension key field 1010 includes a combination of an artifact key and a dimensional storage reference key. The artifact key includes the artifact identifier, while the dimensional storage reference key points to a segment storage table identifier that resolves to a segment storage table name and record number where the segment is stored. The segment storage table stores information of the segments as described above.

Context key field 1020 includes a combination of the artifact key described above and a contextual level key including the context identifier that is derived by the artifact management system during establishment of the artifact (and is not visible to or accessible by the artifact creator or maintainer). Establishment or set-up of an artifact facilitates operation of the underlying artifact management system as described below.

Segment key field 1030 includes a combination of the artifact key described above and a segment order identifier that is a positional identifier defined within segment properties described below. The segment order identifier is utilized for assembling the segments to form or reconstitute the artifact.

Segment type field 1040 includes a unique segment type value. The segment type value derivation is associated with the artifact set-up process to insure that no two artifacts share the same segment type references. Segment value field 1050 includes encrypted contents of the segment. Segment properties field 1060 includes a combination of the dimension key field for the next segment, a positional reference, and an encryption key value.

The positional reference indicates whether the related segment order identifier reflects an ascending, descending, collapsing, or expansion method of ordering the storage of, and reconstituting, the related segment type. The implementation of these orderings may be used as approaches to fill a fixed length array for reconstituting the artifact. For example, ascending refers to arrangement of artifact segments in an ascending order (of the array indexes), while descending refers to arrangement of artifact segments in descending order (of the array indexes). Collapsing refers to an outside-inward approach (e.g., storing the segments starting at the beginning and end points of the array and working toward the intermediate portion), while expansion is an inside-outward approach (e.g., storing the segments starting at the intermediate portion of the array and working toward the beginning and end points). The use of briar segments allows for either an even or odd number of array dimensions in order to provide a sufficient quantity of segments to facilitate these orderings.

Briar segments are used for the storage of an artifact, and are included for viewing and printing of the artifact. A briar segment may include a statement (e.g., "This line left blank", "Intentionally left blank", "As stated earlier", etc.), or may further include long run-on sentences or groupings of words. A briar segment reflects the purpose (e.g., storage, viewing, printing, etc.) of the artifact, and should be distinctive. The generation of briar segments is rule driven to enable a distinctive repetitive pattern of usage. These statements may be utilized to embed both artifact access and module identifiers within the resulting artifact, where the module identifiers indicate the functional modules to process the segment.

The encryption key value may include a portion of an encryption key, an entire encryption key value, or an empty value. The particular portion of an encryption key is dependent on the segmentation level which is determined during establishment or set-up of the artifact. The segmentation level indicates a granularity of content for storage in a segment (e.g., a paragraph of a chapter, a sentence of a paragraph, etc.).

The above field descriptions refer to a combination of items. However, the items may be combined in any desired fashion (e.g., concatenation, value shuffling, etc.), typically during establishment or set-up of the artifact.

Since an artifact may include any quantity of segments, an access point may be associated with a particular access request and indicated by an identifier within that access request. The artifact access points are generated by the artifact management system, and preferably stored within database 118. An access point identifier within an artifact access request (e.g., FIG. 11) indicates the storage location of a corresponding access point. An access point indicates an entry location (e.g., a file or segment storage table name and record number for a particular segment) for an associated user within the artifact (e.g., to retrieve, view, print, or perform other operations on the artifact), and typically lapses upon expiration of a corresponding time interval as described above. Access points suitable for use are those residing within valid access requests (e.g., access requests with access points that have not expired). When assigning access points to requests, the artifact management system examines the valid access requests for an artifact to determine the access points in use, and assigns a next available access point to a valid access request. When an access point expires, the contents of the corresponding segment are removed and a new segment is generated to prevent future access by the expired access point.

In order to facilitate tracking, each segment access point may become part of the resulting compiled artifact in a manner that is to be indistinguishable to the reader or user (e.g., embedded within a briar segment), but sufficient enough that upon examination the access point can be derived and used to back trace to a specific artifact access request.

Figure 11:
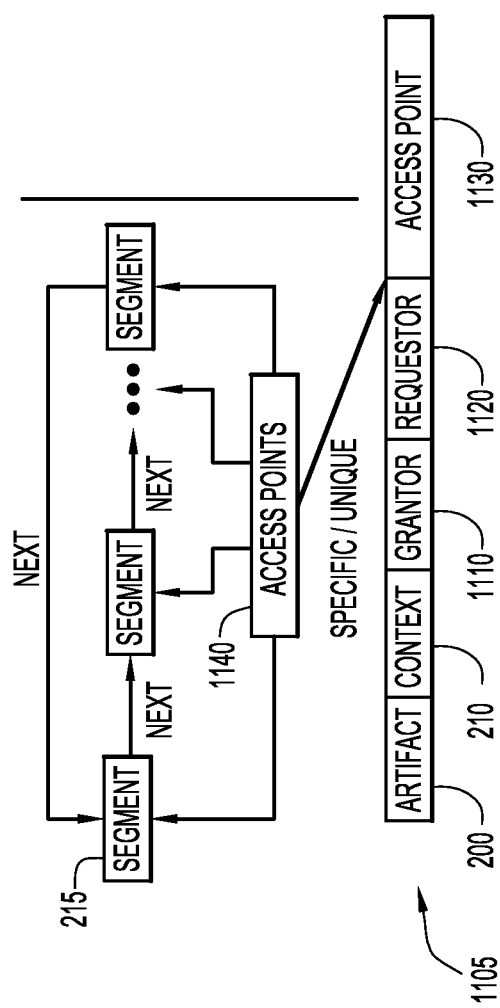
FIG. 11 is a diagrammatic illustration of a manner of accessing an artifact according to an embodiment of the present invention.

Referring to FIG. 11, an access request 1105 for an artifact includes artifact identifier 200, context identifier 210, a grantor 1110 (including one or more module identifiers indicating functional modules to process the request or artifact) providing access to the artifact, a requestor or user 1120 (e.g., including a user identification) requesting access to the artifact, and an access point identifier 1130 indicating an access point that provides an entry point for the artifact and is associated with the requestor. Access point identifier 1130 indicates one of corresponding access points 1140 associated with the artifact. The request for the artifact may be generated based on information provided via a user interface presented by a client system 114 (FIG. 1).

When access to the artifact is requested, artifact segments 215 are traversed starting at the artifact segment indicated by the access point identified by access point identifier 1130 within access request 1105 and associated with requestor 1120. An artifact segment contains specific properties regarding context and segment order with respect to the reconstitution of the stored artifact. Briar segments may be included within the artifact segments that include extraneous and artificial data. Tracking information may be embedded within this data which is excluded from the final construction of the artifact, and acts as additional safeguards. Encryption of an artifact is to be applied at one or more of identified dimensional layers (or segments) in a manner or style chosen by an administrator as described below. The encryption of briar and chaff segments matches the content of the artifact to be further indistinguishable from the artifact content.

The artifact segments are traversed based on pointers within those segments indicating the next artifact segment in sequence, and the artifact is reconstituted from retrieved segment contents by arranging the retrieved segments (and associated content) in an appropriate order. Segment order enables access of artifacts to be limited to a specific consolidation module (e.g., of artifact manager module 120) indicated within the access request that decrypts the artifact segments, distinguishes valid segments from chaff and briar segments, and properly orders the artifact segments. While an artifact can be retrieved, the artifact can not be reconstituted without the corresponding consolidation module. The consolidation module may embed briar segment information within exported or printed versions of the artifact that may be used to track access as described below.

Using pre-set sensitivity or context labels, the context of an artifact and the number of contexts associated with the artifact may be selected. Once the contextual levels are selected for the artifact, context identifiers 210 for the artifact and artifact segments are generated by the artifact management system. These context identifiers are stored in a manner to insure that the grouping of context specific segments is further obscured. Manual identification of artifact segment context levels and assigning of a single homogenous context are supported by the artifact management system. Segmentation of an artifact prior to storage facilitates the ability to define artifact versions tailored to specific access requests (or sensitivity of a requestor). In this case, the artifact segments may be retrieved based on the context or sensitivity to provide artifact segments commensurate with access rights of the requestor. For example, if a requestor has a certain level of access, only those artifact segments with a context or sensitivity commensurate with the same or lower level of rights is provided from the artifact. The access points utilized for accesses of the artifact are stored within an artifact access log 2019 (FIG. 20), and may be used to ascertain users accessing the artifact as described below. In addition, user defined segments may be further segmented and assigned context levels for enhanced granularity with respect to assignment of context levels.

The artifact management system employs a segment storage catalogue to track available records for storage of artifact segments in the segment storage tables. The artifact segment storage catalogue preferably includes fixed length alphanumeric identifiers each resolving to a specific name of a segment storage table and corresponding record numbers. The segment storage table names are randomly generated and established at system initialization, and additional entries to the segment storage catalogue may be added as needed. The segment storage catalogue is primarily utilized for maintaining available records or storage locations for storing artifact segments within the segment storage tables, and typically does not contain artifact specific information.

System administrative information is stored and managed via use of administrative segments, where the system administrative information is treated in substantially the same manner as an artifact. The administrative segments are similar to artifact segments, but include slight differences. By way of example, the administrative segments include artifact access requests and authorizations, and artifact properties including those that enable resolution of identifiers to a specific segment storage table containing the artifact segment. In addition, the administrative segments include the segment storage catalogue that tracks available records in the segment storage tables. The administrative segments are periodically relocated among the artifact segments within the segment storage tables. The administrative segments may be retrieved based on artifact properties (e.g., artifact identification, context identifier, etc.). The encryption technique and keys employed for the administrative segments are provided by the administrative system (e.g., server system 100 and artifact administration module 116) (and beyond the control and/or view of any specific artifact manager functional modules).

The administration of an artifact remains within the scope of the artifact. In other words, there are no anonymous administrative or maintenance modules. The functional modules of the artifact manager module generally do not allow mixed role functionality, but are targeted for a singular specific scope. Thus, no one outside of a role specific artifact user group should have access to the corresponding role related module, and super users are typically not supported.

The artifact management system supports various user groups or roles (e.g., administrators, editors, authors, reviewers, viewers, and printers) each permitting their respective users to perform corresponding operations within the artifact management system. For example, at least one administrator establishes an artifact administrative group. Once the artifact administrative group is created, the administrator creating the group no longer has rights associated with the group. An artifact administrative group is responsible for identification of artifact related context identifiers and generation of artifact user groups.

The remaining artifact user groups (e.g., other than the artifact administrative group) include editors, authors, reviewers, viewers, and printers. Each of these groups is associated with one or more specific functional modules (e.g., of artifact manager module 120) that provide the corresponding functionality for that group (e.g., and are indicated in access requests). For example, authors are responsible for the creation of an artifact, while both editors and authors are responsible for the maintenance of the artifact. Typically, editors and/or authors are included in a reviewer group to address review comments. Reviewers are a time frame limited group that are allowed to review artifacts during creation and maintenance. Once access for a reviewer expires (e.g., after expiration of a corresponding time interval), regaining access may be accomplished by forming a new reviewer group (since the expired access typically cannot be reset or renewed). A related functional module (e.g., of artifact manager module 120) enables creation of notations and responses to reviewer comments either by the editors, authors, or other reviewers.

A viewer user group provides specific rights to members to access an artifact. Generally, no users of a viewer group may print or use any copy functionality in a viewing/reading user interface presenting an artifact. A printers user group is a time bound group that enables members to print or create copies of an artifact.

An additional level of control is provided in the form of module registration. In this case, each functional module of artifact manager module 120 is registered and authorized for use. For example, access to an artifact may be limited to a specific class of modules, thereby providing discrete access control over stored artifacts.

The artifact management system enables selection of various parameters for operation. The parameters may be initially entered or modified in any suitable order. Typically, an artifact is established within the artifact management system for a desired item (e.g., document, image, etc.), and parameters for the artifact (e.g., context or sensitivity, segmentation, etc.) are specified by users (since the properties of the item are known). These parameters include information enabling the item to be imported into the artifact management system as the established artifact as described below.

Figure 12:
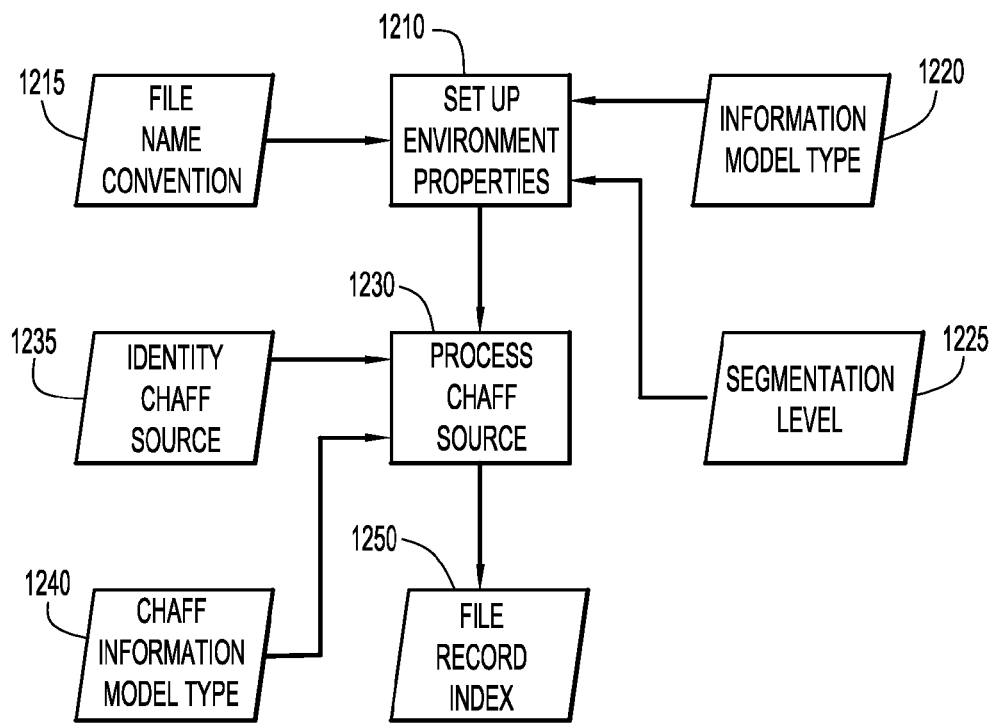
FIG. 12 is a flow diagram illustrating a manner of configuring an environment for artifact management according to an embodiment of the present invention.

A manner in which an environment of the artifact management system is configured (e.g., via artifact administration module 116 and server system 100) is illustrated in FIG. 12. In particular, environment properties are established at step 1210. The environment properties include a file (or table) name convention 1215, information model type 1220 (e.g., a type of information model 240 (FIG. 2)), and a desired segmentation level 1225 specifying the granularity for segmentation of an artifact (e.g., segment at the paragraph, sentence, or word level for a document, etc.). The environment properties are preferably entered by an administrator via a user interface presented by a client system 114 (FIG. 1).

An artifact is decomposed into segments that are stored randomly among a plurality of files or segment storage tables, where additional or chaff segments may be employed to obfuscate sensitive information as described above. A chaff source 1235 and a chaff information model type 1240 (e.g., a type of information model 240 (FIG. 2)) are provided to process chaff from the identified chaff source at step 1230. The chaff source and chaff information model type are preferably entered by an administrator via a user interface presented by a client system 114 (FIG. 1). A resulting record index 1250 is produced that identifies records within the files or segment storage tables. The record index is utilized for obtaining access points as described below.

Figure 13:
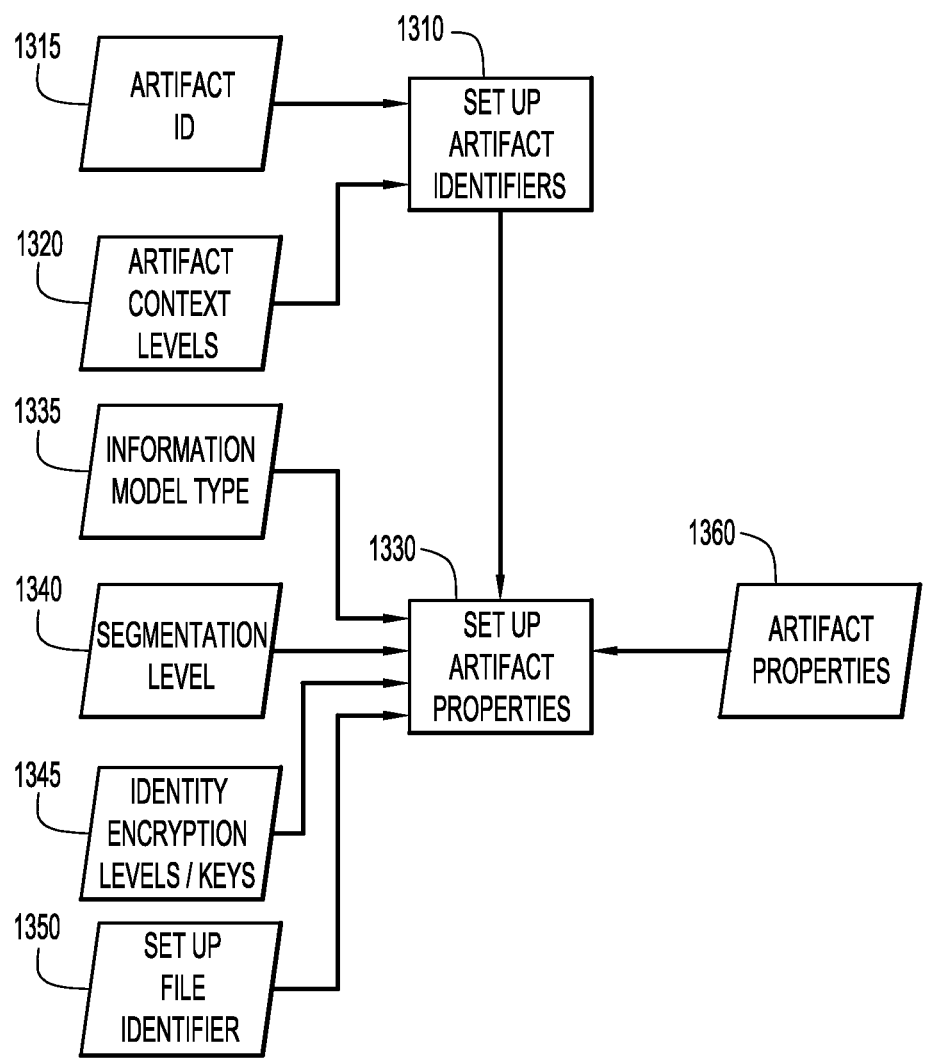
FIG. 13 is a flow diagram illustrating a manner of establishing an artifact according to an embodiment of the present invention.

A manner in which an artifact is established (e.g., via artifact administration module 116 and server system 100) is illustrated in FIG. 13. In particular, artifact identifiers are established at step 1310 based on an artifact identification 1315 and artifact context levels 1320. The artifact identification is generated by the artifact management system, while the context levels are preferably entered by an administrator via a user interface presented by a client system 114 (FIG. 1). The artifact identification provides a unique identifier for an artifact, while the context levels indicate the level of sensitivity or confidentiality for an artifact and corresponding artifact segments (e.g., where segments may be associated with varying sensitivity levels). The artifact management system generates context identifiers for the artifact and artifact segments from the entered context levels.

Artifact properties are established at step 1330 based on an information model type 1335 (e.g., type of information model 240 (FIG. 2)), a segmentation level 1340 specifying the granularity for segmentation of an artifact and/or segments (e.g., segment at the paragraph, sentence, or word level for a document, etc.), encryption level keys 1345 for encryption of artifact content, and a file or table identifier 1350 for storage of the artifact. Identifier 1350 may be obtained from the segment storage catalogue, while the remaining information is preferably entered by an administrator via a user interface presented by a client system 114 (FIG. 1). The resulting artifact properties 1360 are produced, and may include an artifact identifier; a number of context levels; artifact context identifiers; a default artifact context level; a default artifact segment context level; and a default artifact segmentation level. Artifact properties, including those relevant to resolving the location of artifact segments (e.g., identifier 1350), are stored within administrative segments to enable retrieval of the artifact as described below.

Figure 14:
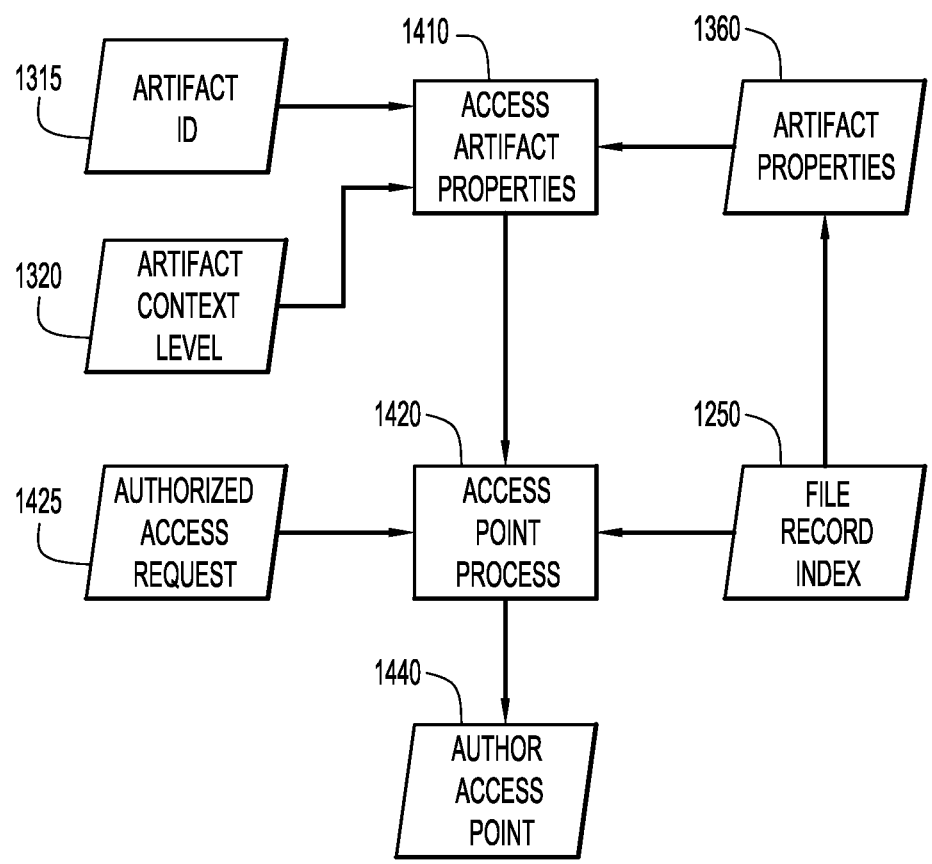
FIG. 14 is a flow diagram illustrating a manner of establishing a user with an author role for artifact management according to an embodiment of the present invention.

A manner in which a user is established with an author role (e.g., via artifact administration module 116 and server system 100) is illustrated in FIG. 14. Initially, an author role enables a user to modify (including adding material to) an artifact. In particular, an artifact identification 1315 and context level 1320 are provided to specify an artifact for the user, and artifact properties 1360 for the specified artifact are accessed at step 1410. The artifact identification, context level, and context identifier are determined from information (e.g., artifact selection, context level selection, etc.) entered by an administrator via a user interface presented by a client system 114 (FIG. 1). The artifact identification and context identifier are utilized to retrieve the administrative segments for the artifact that contain various information including artifact properties.

In addition, an authorized access request 1425 (e.g., similar to the access request described above for FIG. 11) is generated by the artifact management system, and an access point process is performed at step 1420 to determine an appropriate access point 1440 for the user in an author role. The process utilizes artifact properties 1360 and file record index 1250 (e.g., produced from establishing the environment as described above for FIG. 12) to determine the appropriate access point into the artifact for the user in an author role. The resulting access point for the user is stored in an author access point list. The access points are typically bound to specific users to enable tracking of access to the artifact, where the authorized access request indicates a type of access and includes a pointer to the corresponding access point. The authorized access request is preferably stored within administrative segments as described above.

Since an author imports an external item into the established artifact, the file record index is utilized to provide an access point at the initial storage location for the artifact. If additional authors are provided, the access point list for the artifact generated from processing the external item may be used to determine access points for the additional authors. In particular, the artifact management system examines the valid access requests for an artifact to determine the access points in use, and assigns a next available access point to the user or generated access request.

A user with an author role initially creates an artifact within the artifact management system by indicating an item containing content (e.g., document, image, text, etc.) to be processed for storage as an artifact. The artifact to contain the item contents is established or registered within the artifact management system as described above (e.g., FIG. 13), and the item is processed to extract appropriate information and store the information in an information model specified for the artifact.

Figure 15:
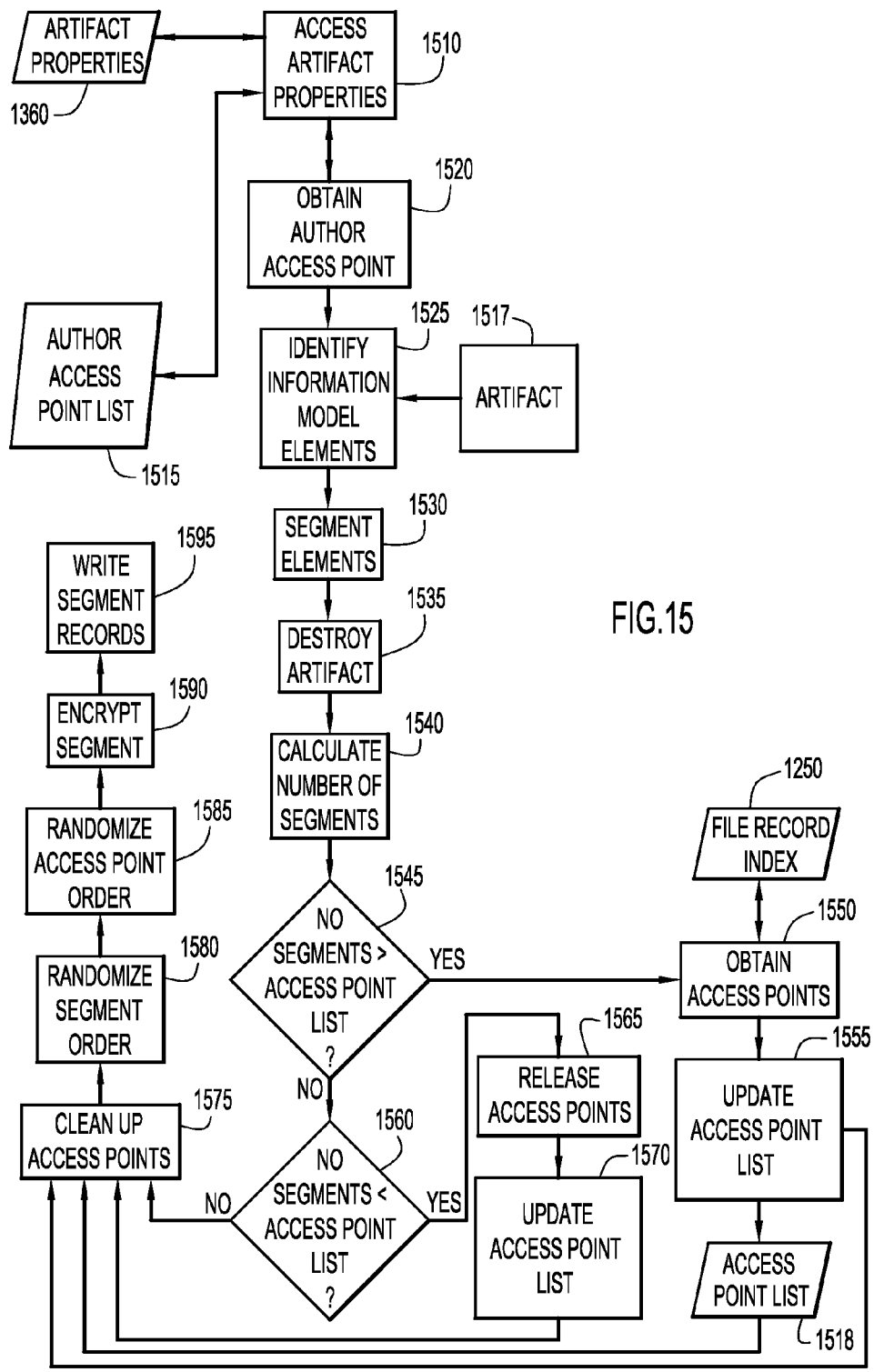
FIG. 15 is a flow diagram illustrating a manner of initially storing an artifact according to an embodiment of the present invention.

A manner of processing an item for storage as an artifact (e.g., via artifact manager module 120 and server system 100) is illustrated in FIG. 15. Initially, an artifact is established in the artifact management system with at least one user designated as an author for the artifact as described above. In particular, artifact properties 1360 and an author access point list 1515 (e.g., including access points for users with an author role) for the artifact are accessed at step 1510. The artifact identification and context identifier may be utilized to retrieve the administrative segments for the artifact that contain various information including artifact properties. The access point for the user in an author role is determined at step 1520 from the author access point list based on the artifact properties and user with the author role. An item 1517 (e.g., document, image, etc.) containing content for the artifact is processed at step 1525 to identify the portions of content for corresponding information model elements, and corresponding artifact segments (e.g., as described above for FIG. 10) are formed in accordance with the information model at step 1530 that collectively contain the item contents. The item may be indicated via a user interface presented by a client system 114 (FIG. 1). Once the item contents are stored within the artifact segments, the item is deleted at step 1535 to completely control access to the item contents via the corresponding artifact.

The number of segments formed within the artifact is determined at step 1540. If the number of segments formed is greater than the number of access points in an access point list 1518 containing the access points for the artifact as determined at step 1545, additional access points are generated for the artifact by the artifact management system at step 1550 in order to cover the excess segments. The additional access points are determined based on file index record 1250 identifying records within the segment storage tables (e.g., as described above for FIG. 12) and the artifact segmentation, and the access point list is updated with the additional access points at step 1555.

When the number of segments is less than the number of access points in the access point list for the artifact as determined at steps 1545 and 1560, the excess access points are released at step 1565, and the access point list is updated to reflect the released access points at step 1570.

Once the number of segments is commensurate with the number of access points within the access point list for the artifact (e.g., as indicated by steps 1555 and 1570 and as determined from steps 1545 and 1560), a record is cleared (e.g., prior values within the record are erased or to set to null) at step 1575, and the access points (or access point list) for the artifact are stored in the cleared record in database 118. The order of the artifact segments is randomized at step 1580, while the order of the access points for the artifact are similarly randomized at step 1585. The segment contents are encrypted in accordance with the specified encryption levels and keys (e.g., as described above for FIG. 13) at step 1590, and the segments are stored as records randomly among the segment storage tables as described above at step 1595. The segment storage catalogue provides the available records for storage of the segments, and is updated in response to storage of the segments.

Figure 16:
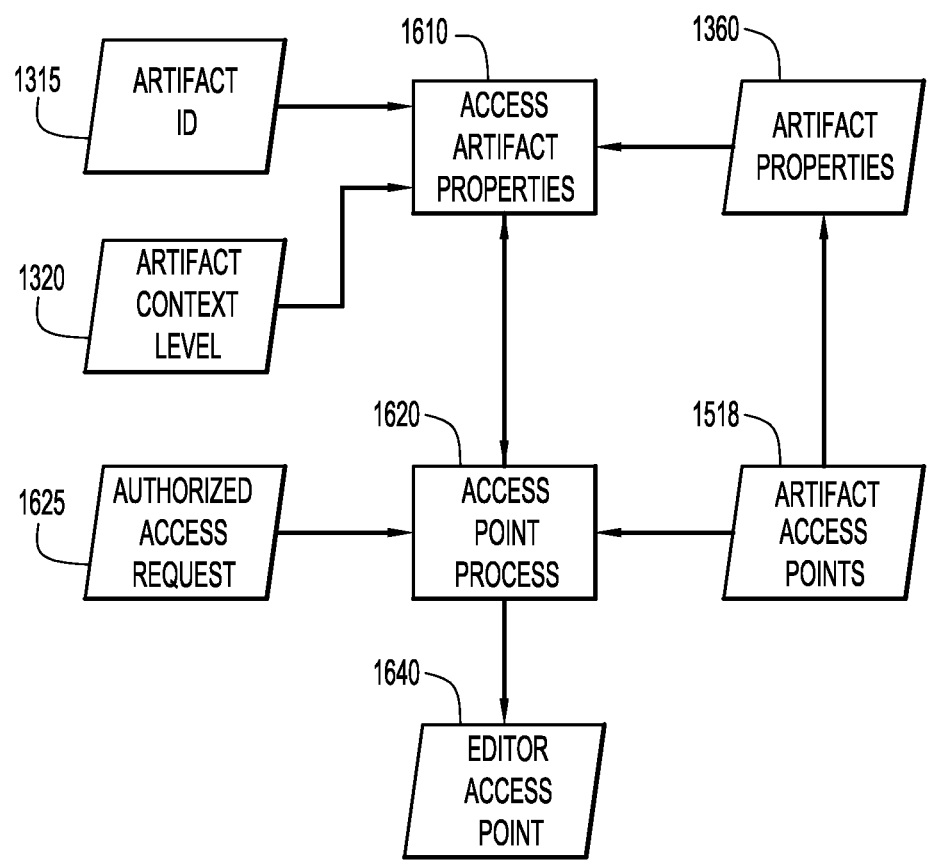
FIG. 16 is a flow diagram illustrating a manner of establishing a user with an editor role for artifact management according to an embodiment of the present invention.

A manner in which a user is established with an editor role (e.g., via artifact administration module 116 and server system 100) is illustrated in FIG. 16. Initially, an editor role enables a user to modify (but typically not add material to) an artifact. In particular, an artifact identification 1315 and context level 1320 are provided to specify an artifact to be edited, and artifact properties 1360 for the specified artifact are accessed at step 1610. The artifact identification, context level, and context identifier are preferably determined from information (e.g., artifact selection, context level selection, etc.) entered by an administrator via a user interface presented by a client system 114 (FIG. 1). The artifact identification and context identifier are utilized to retrieve the administrative segments for the artifact that contain various information including artifact properties.

In addition, an authorized access request 1625 (e.g., similar to the access request described above for FIG. 11) is generated by the artifact management system, and an access point process is performed at step 1620 to determine an appropriate access point 1640 for the user in an editor role. The process utilizes artifact properties 1360 and access points 1518 (e.g., generated for the artifact by the artifact management system based on the segmentation) to determine or select the appropriate access point into the artifact for the user in an editor role. The artifact management system examines the valid access requests for the artifact within the administrative segments to determine the access points in use, and assigns a next available access point to the user or generated access request. The resulting access point for the user is stored in an editor access point list. The access points are typically bound to specific users to enable tracking of access to the artifact, where the authorized access request indicates the type of access and includes a pointer to the corresponding access point. The authorized access request is preferably stored within administrative segments as described above.

Figure 17:
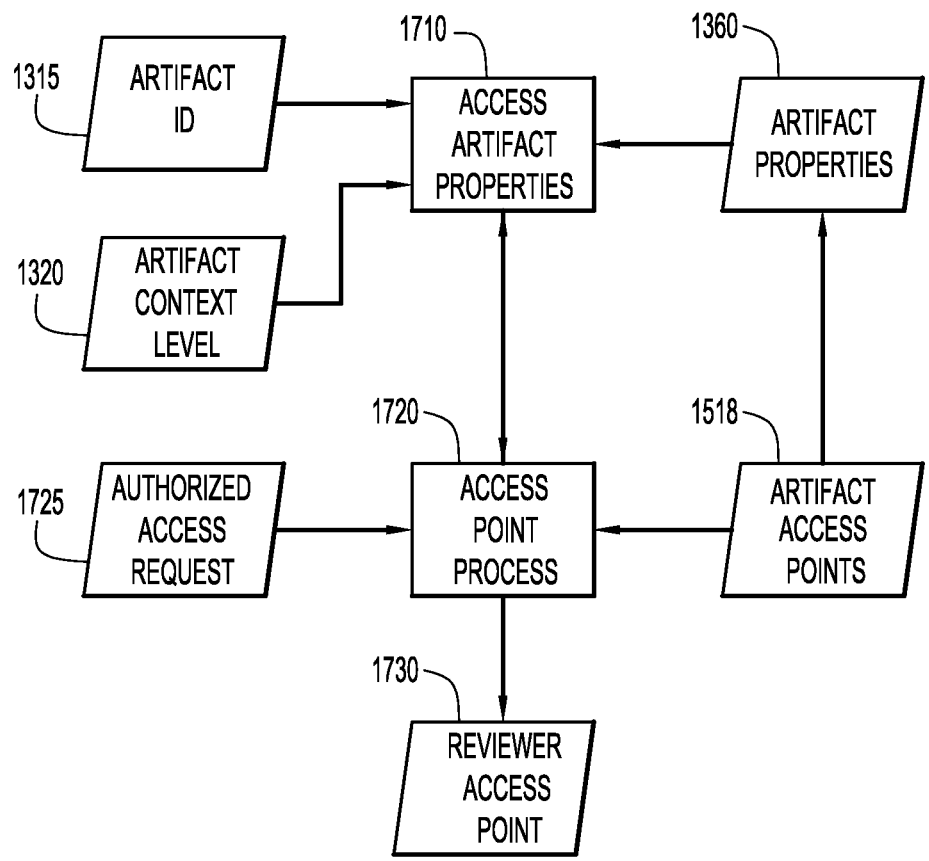
FIG. 17 is a flow diagram illustrating a manner of establishing a user having a reviewer role for artifact management according to an embodiment of the present invention.

A manner in which a user is established with a reviewer role (e.g., via artifact administration module 116 and server system 100) is illustrated in FIG. 17. In particular, an artifact identification 1315 and artifact context level 1320 are provided to specify an artifact to be reviewed, and artifact properties 1360 for the specified artifact are accessed at step 1710. The artifact identification, context level, and context identifier are preferably determined from information (e.g., artifact selection, context level selection, etc.) entered by an administrator via a user interface presented by a client system 114 (FIG. 1). The artifact identification and context identifier are utilized to retrieve the administrative segments for the artifact that contain various information including artifact properties.

In addition, an authorized access request 1725 (e.g., similar to the access request described above for FIG. 11) is generated by the artifact management system, and an access point process is performed at step 1720 to determine an appropriate access point 1730 for the user in a reviewer role. The process utilizes artifact properties 1360 and artifact access points 1518 (e.g., generated for the artifact by the artifact management system based on the segmentation) to determine or select the appropriate access point into the artifact for the user in a reviewer role. The artifact management system examines the valid access requests for the artifact within the administrative segments to determine the access points in use, and assigns a next available access point to the user or generated access request. The access points are typically bound to specific users to enable tracking of access to the artifact, where the authorized access request indicates the type of access and includes a pointer to the corresponding access point. The authorized access request is preferably stored within administrative segments as described above.

Figure 18:
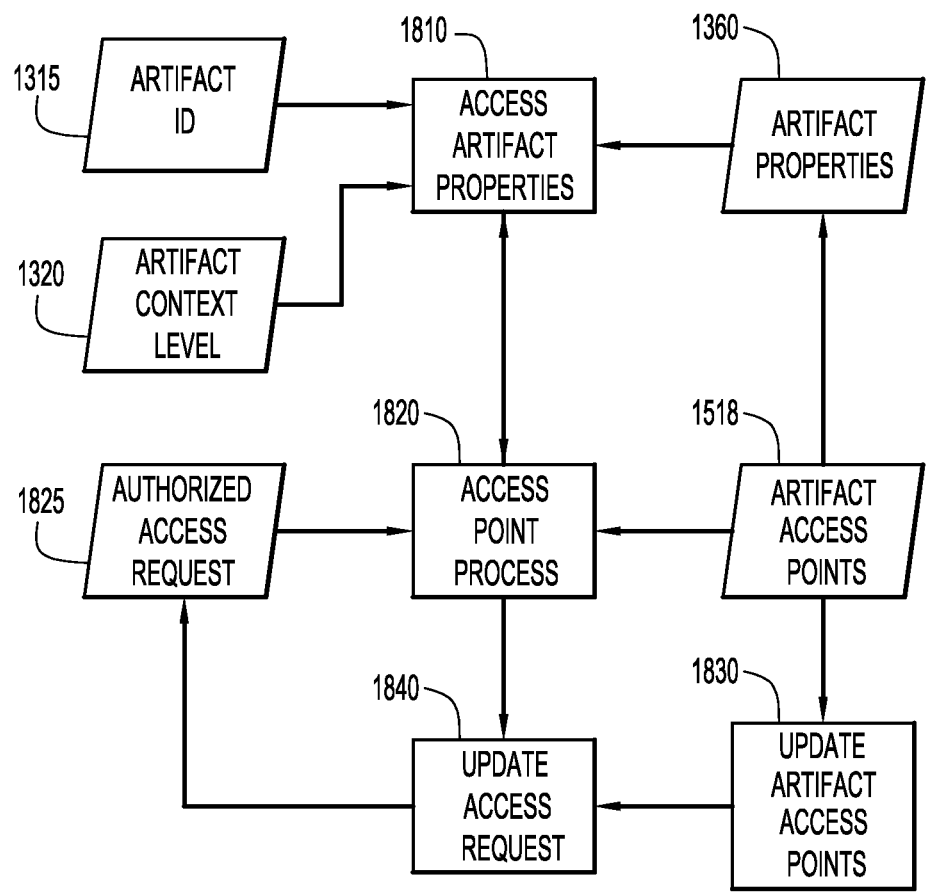
FIG. 18 is a flow diagram illustrating a manner of establishing a user with a viewer or printer role for artifact management according to an embodiment of the present invention.

A manner in which a user is established with a viewer or printer role (e.g., via artifact administration module 116 and server system 100) is illustrated in FIG. 18. Initially, an access or viewer role enables a user to view the artifact, while a printer role enables a user to print or copy an artifact. In particular, an artifact identification 1315 and artifact context level 1320 are provided to specify an artifact to be viewed, copied, or printed, and artifact properties 1360 for the specified artifact are accessed at step 1810. The artifact identification, context level, and context identifier are preferably determined from information (e.g., artifact selection, context level selection, etc.) entered by an administrator via a user interface presented by a client system 114 (FIG. 1). The artifact identification and context identifier are utilized to retrieve the administrative segments for the artifact that contain various information including artifact properties.

In addition, an authorized access request 1825 (e.g., similar to the access request described above for FIG. 11) is generated by the artifact management system, and an access point process is performed at step 1820 to determine an appropriate access point for the user in a viewer or printer role. The process utilizes artifact properties 1360 and artifact access points 1518 (e.g., generated for the artifact by the artifact management system based on the segmentation) to determine or select the appropriate access point into the artifact for the user in a viewer or printer role. The artifact management system examines the valid access requests within the administrative segments for the artifact to determine the access points in use, and assigns a next available access point to the user or generated access request. The access points are typically bound to specific users to enable tracking of access to the artifact, where the authorized access request indicates the type of access and includes a pointer to the corresponding access point. The authorized access request is preferably stored within administrative segments as described above.

In order to maintain security, the access points for the viewer and printer are updated at step 1830 (e.g., after a predetermined time interval, after one or more accesses, etc.) and stored utilizing a similar process to that performed to initially determine or select the access point. Once the updated access point is determined, access request 1825 is updated at step 1840 to include a pointer pointing to the updated access point.

Figure 19:
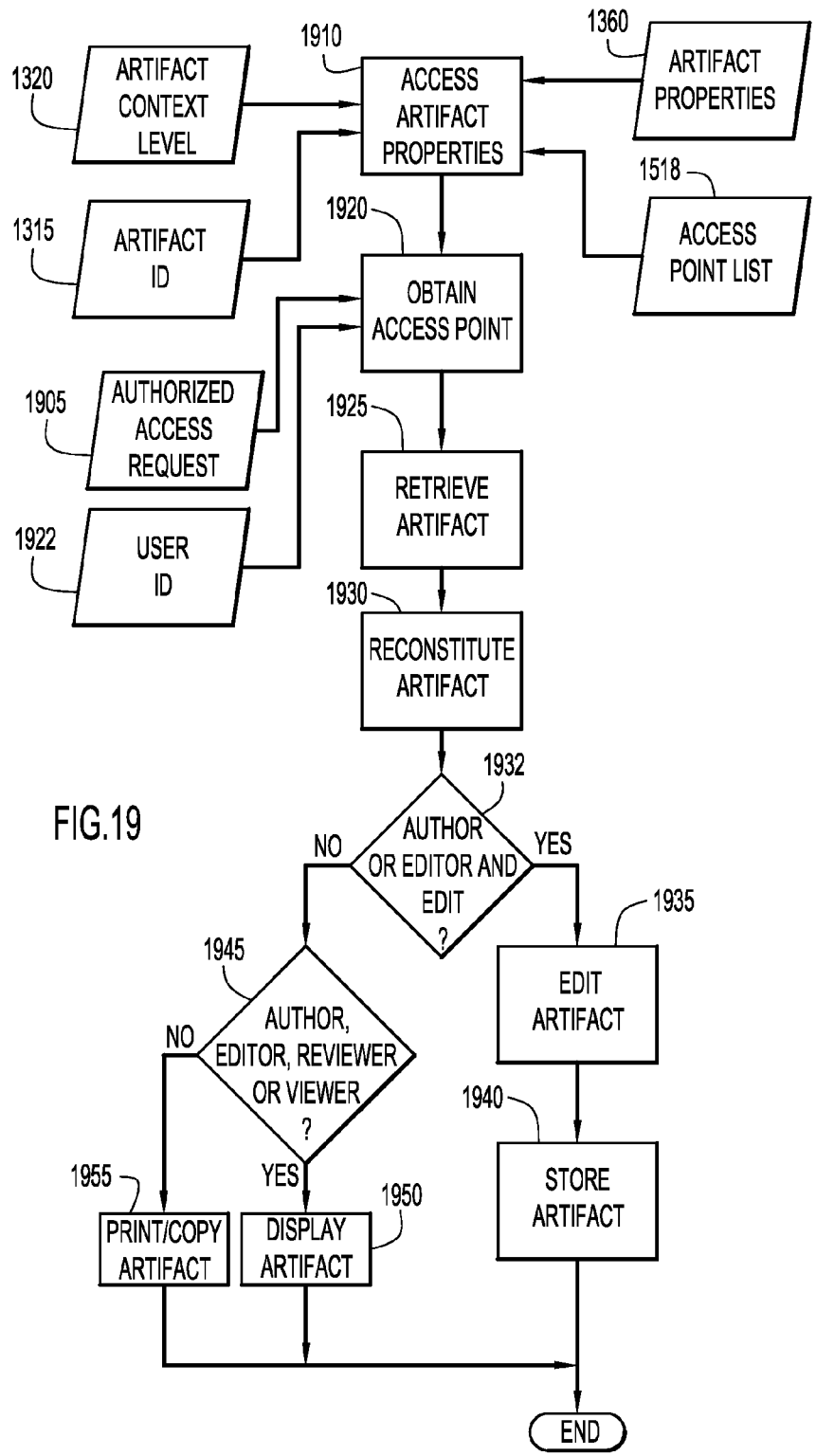
FIG. 19 is a flow diagram illustrating a manner of accessing a stored artifact according to an embodiment of the present invention.

A manner of accessing an artifact (e.g., via artifact manager module 120 and server system 100) is illustrated in FIG. 19. In particular, artifact identification 1315 and artifact context level 1320 are provided to specify an artifact to be accessed, and artifact properties 1360 for the specified artifact are accessed at step 1910. The artifact identification, context level, and context identifier are preferably determined from information (e.g., artifact selection, context level selection, etc.) entered by a user (e.g., in an author, editor, reviewer, viewer, or printer role) via a user interface presented by a client system 114 (FIG. 1). The artifact identification and context identifier are utilized to retrieve the administrative segments for the artifact that contain various information including artifact properties.

In addition, an access point process is performed at step 1920 to determine an appropriate access point for the user. Basically, an authorized access request 1915 (e.g., similar to the access request described above for FIG. 11) for the user indicating the access point is retrieved from the administrative segments based on a user identification 1922, access point list 1518, and artifact properties 1360. The user identification is preferably determined from information (e.g., user name or other identifying information) entered by the user via a user interface presented by a client system 114 (FIG. 1), while access point list 1518 is retrieved based on the specified artifact.

Once the access point is determined, the corresponding artifact is retrieved and processed (e.g., via the functional modules corresponding to the user role and indicated in the access request). In particular, the corresponding artifact is retrieved at step 1925. The artifact segments are retrieved starting from the segment indicated by the determined access point. The retrieved segments are arranged in their proper order to reconstitute the artifact and provide the artifact contents at step 1930. If the user has an author or editor role as determined at step 1932, the artifact content may be edited at step 1935. In this case, a user with an author role may modify or add content, while a user with an editor role may simply modify existing artifact content. The editing is preferably accomplished via a user interface provided by a client system 114 (FIG. 1). The edited artifact is subsequently stored at step 1940. If content has been added to the artifact to cause generation of additional artifact segments to contain the artifact content, a new set of access points is determined and ordered, and the artifact segments are re-ordered and stored.

When the user has the role of author, editor, reviewer, or viewer as determined at step 1945, the artifact is displayed for the user at step 1950, preferably via a user interface presented by a client system 114 (FIG. 1). An author, editor, or reviewer may provide comments and/or annotations. If the user has the role of printer as determined at step 1945, the artifact is printed or copied at step 1955. The copying is preferably performed via a user interface presented by a client system 114 (FIG. 1).

Figure 20:
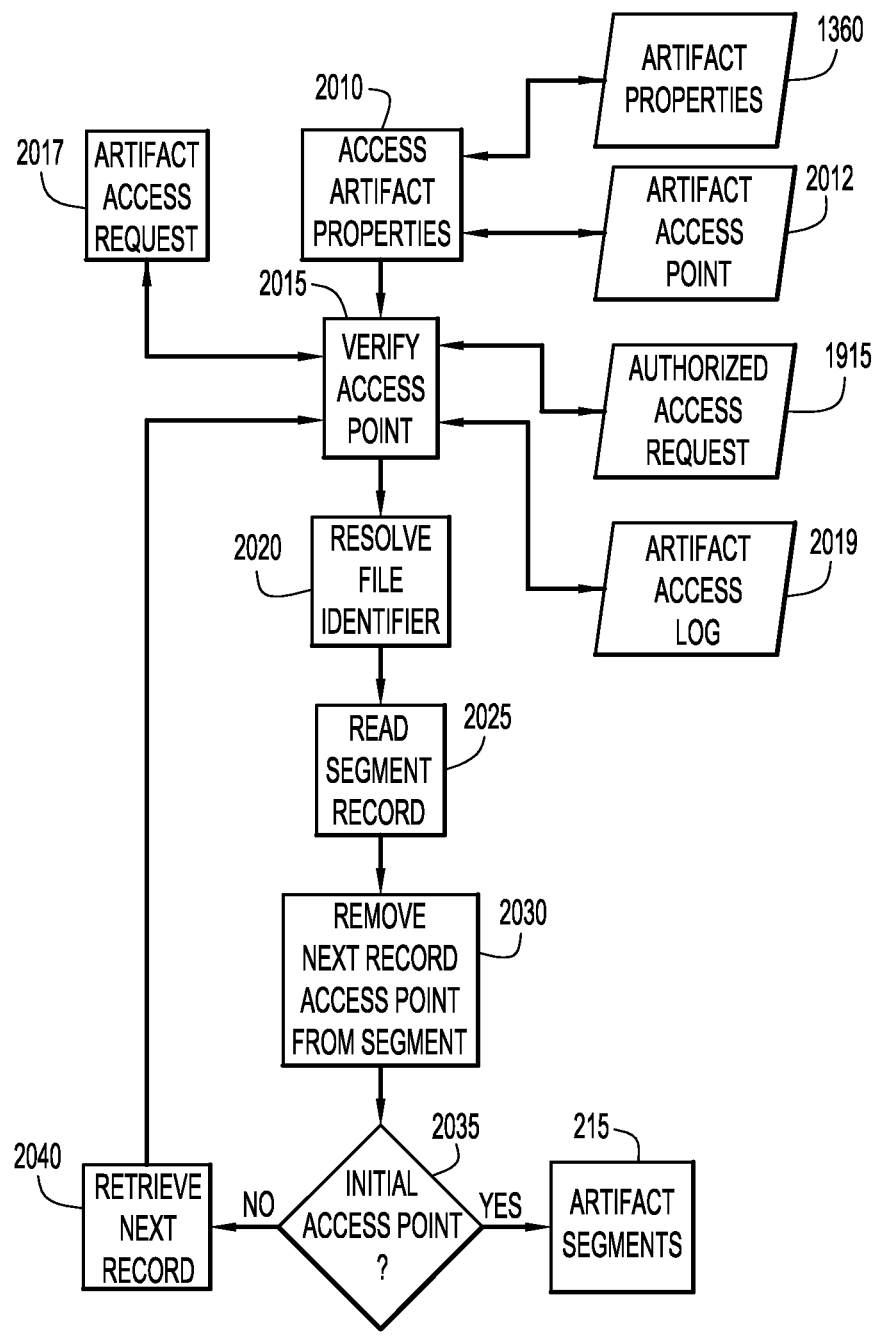
FIG. 20 is a flow diagram illustrating a manner of retrieving a stored artifact according to an embodiment of the present invention.

A manner of retrieving an artifact (e.g., via artifact manager module 120 and server system 100) is illustrated in FIG. 20. Initially, a desired artifact is specified (e.g., via the artifact identification and context level) and a corresponding access point determined for the specified artifact (e.g., as described above for steps 1910 and 1920 of FIG. 19). Artifact properties 1360 for the desired artifact and determined access point 2012 are accessed at step 2010. The artifact identification and context identifier are utilized to retrieve the administrative segments for the artifact that contain various information including artifact properties.

An access point within an artifact access request 2017 (e.g., similar to the access request described above for FIG. 11) is verified at step 2015 based on authorized access request 1915 and an artifact access log 2019. The artifact access log maintains entries of events pertaining to access of the artifacts (e.g., access points, users, etc.). The information within the artifact access request is compared to the authorized access request (e.g., including a pointer to an access point) and the artifact access log to determine the validity of the access point within the artifact access request (e.g., whether the access point has expired, etc.).

Once the access point of the artifact access request is verified, the access point is utilized to determine the location of an initial artifact segment randomly stored among the segment storage tables. In particular, the retrieved administrative segments include artifact properties (e.g., access requests, authorizations, etc.) to enable resolution of the access point identifier within artifact access request 2017. The identifier is resolved at step 2020 to determine the location of and retrieve the corresponding access point. The access point indicates the segment storage table and record number of the initial segment of the artifact to be retrieved.

The initial artifact segment is retrieved at step 2025, and information indicating the location of the next segment (e.g., next dimension key as described above for FIG. 10) is extracted from the retrieved segment at step 2030. The next segment information resolves to a segment storage table name and record number in order to retrieve the next artifact segment.

If the next artifact segment does not correspond to the initially retrieved segment (e.g., additional artifact segments exist) as determined at step 2035, the next artifact segment is retrieved based on the extracted location information at step 2040. The process returns to step 2015 to verify (e.g., compare the next segment location to authorized access requests and the artifact access log) and process the next segment in substantially the same manner described above. This is repeated until the location information in a retrieved segment corresponds to the initially retrieved segment, thereby indicating retrieval of all segments 215 of the artifact.

Figure 21:
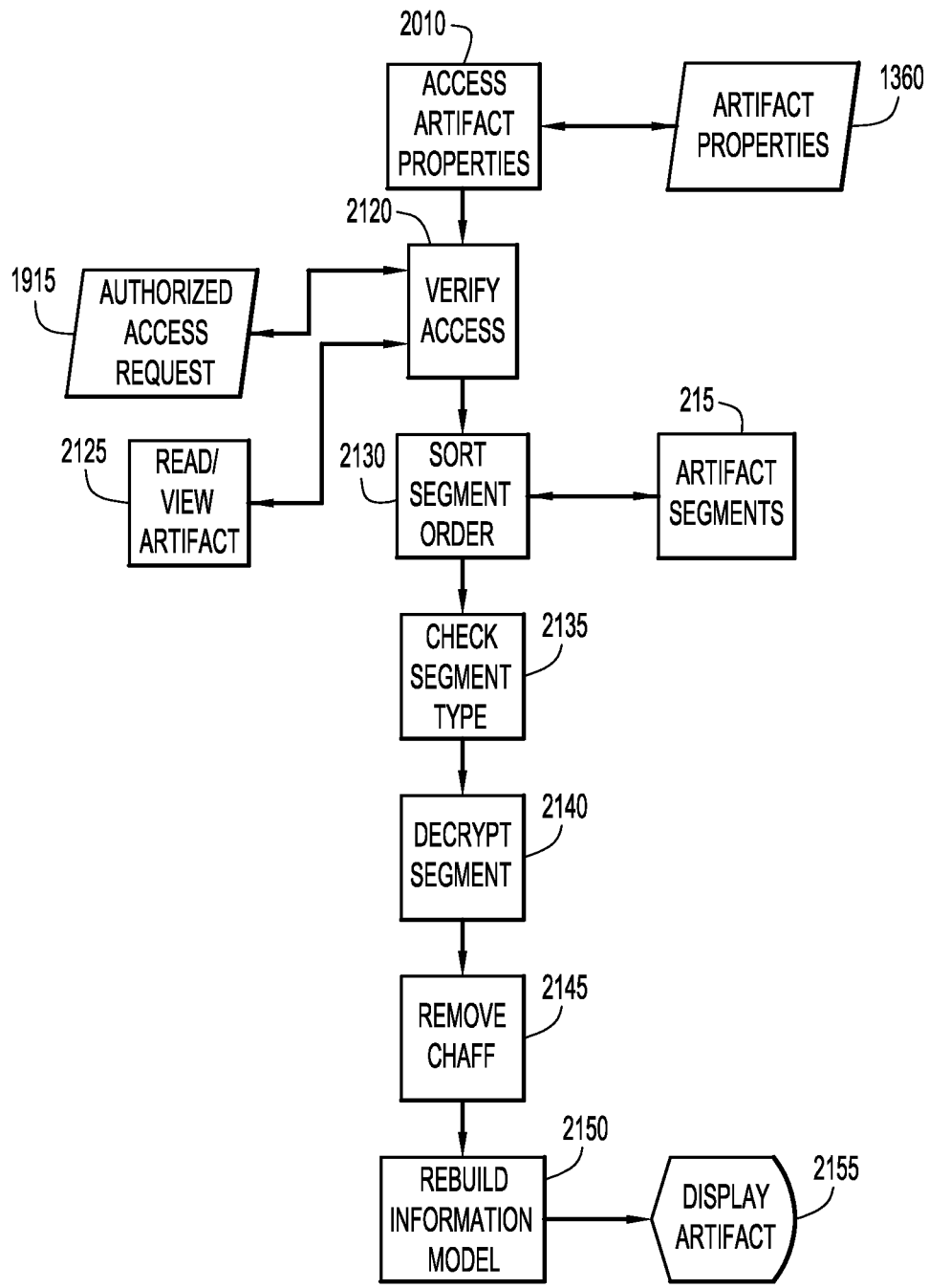
FIG. 21 is a flow diagram illustrating a manner of assembling or reconstituting a retrieved artifact according to an embodiment of the present invention.

A manner of reconstituting or assembling an artifact from retrieved artifact segments (e.g., via artifact manager module 120 and server system 100) is illustrated in FIG. 21. Initially, a desired artifact is specified and corresponding artifact segments 215 are retrieved (e.g., in substantially the same manner described above for steps 1910 and 1920 of FIG. 19 and for FIG. 20). The artifact segments may include filler or chaff segments to obfuscate the artifact within the artifact management system and/or briar segments as described above. Artifact properties 1360 for the desired artifact are accessed at step 2110. The artifact identification and context identifier are utilized to retrieve the administrative segments for the artifact that contain various information including artifact properties.

The requested access is verified at step 2120 based on authorization access request 1915. The information within the authorized access request (e.g., including a pointer to an access point) is compared to the artifact information to determine the validity of the access (e.g., whether the corresponding access point has expired as described above, etc.). In addition, artifact information may be viewed at step 2125 to enable a user to terminate the access via a user interface presented on a client system 114 (FIG. 1).

Once access of the artifact is verified, artifact segments 215 are sorted into their proper order at step 2130 based on positional information within the retrieved segments (e.g., segment order identifier and positional references within segment key and segment properties fields 1030, 1060 of the retrieved segments as described above for FIG. 10). The segment type of each retrieved artifact segment is checked at step 2135 (e.g., segment type field 1040 described above for FIG. 10), and the encrypted contents of each retrieved artifact segment (e.g., segment value field 1050 described above for FIG. 10) are decrypted at step 2140 in accordance with the segment type and the encryption keys and levels within the retrieved segment (e.g., segment type field 1040 and segment properties field 1060 described above for FIG. 10).

Filler or chaff segments are identified within the retrieved artifact segments and removed at step 2145, thereby enabling artifact segments with the initial item content (and briar segments) to remain within the ordered segments. The information model for the artifact is re-generated based on removal of chaff segments at step 2150, and the artifact may be displayed at step 2155 (e.g., for viewing, editing, copying, and/or other activities based on a role of a user).

Figure 22:
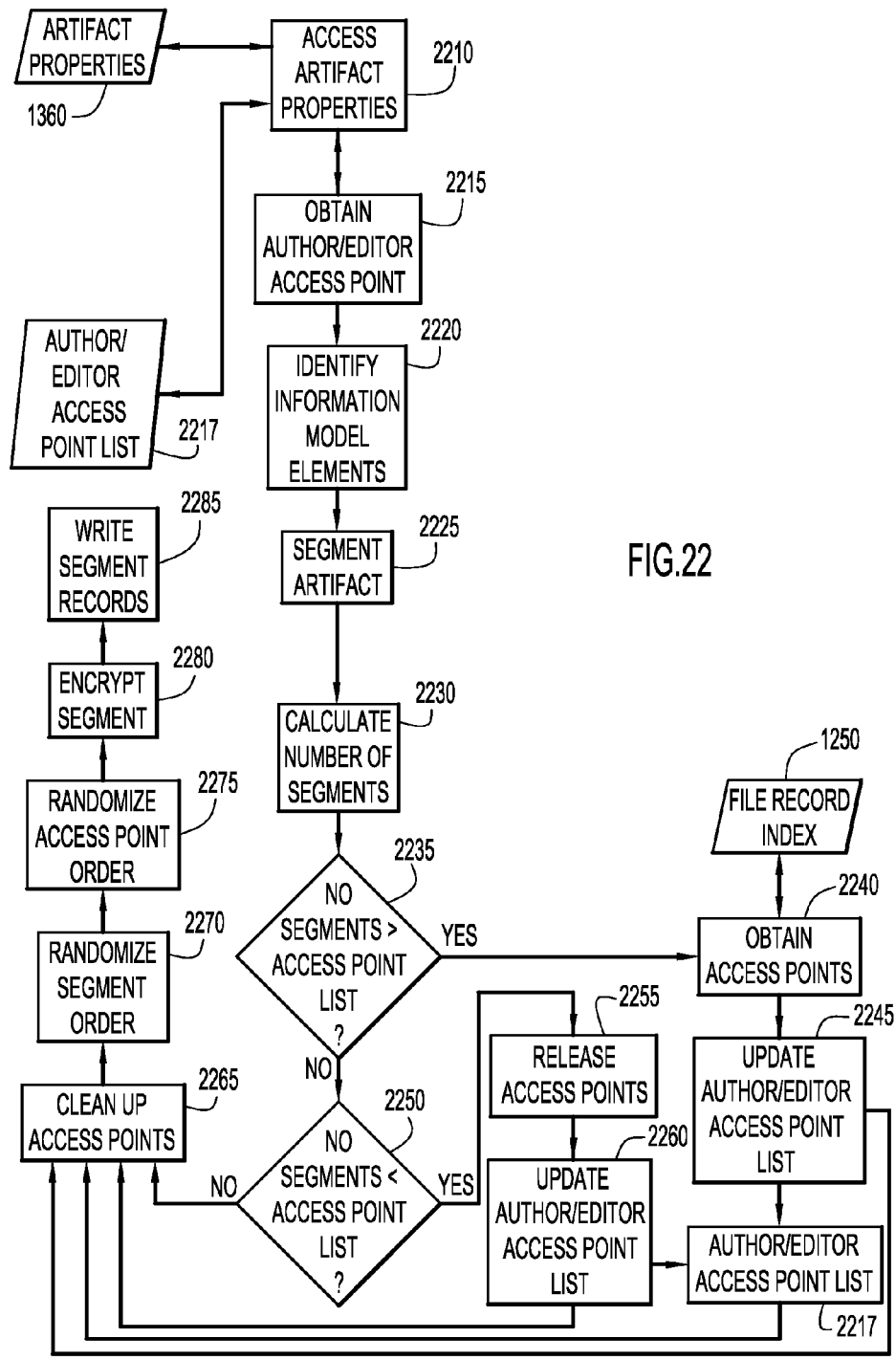
FIG. 22 is a flow diagram illustrating a manner of storing a modified artifact according to an embodiment of the present invention.

A manner of storing an artifact after editing or modification (e.g., via artifact manager module 120 and server system 100) is illustrated in FIG. 22. Initially, a desired artifact is retrieved for a user in a role of author or editor, and subsequently modified (e.g., in substantially the same manner described above for steps 1910, 1920, 1925, 1930 and 1935 of FIG. 19 and for FIGS. 20 and 21). In particular, artifact properties 1360 for the modified artifact and an access point list 2217 for an author or editor role are accessed at step 2210. The artifact identification and context identifier may be utilized to retrieve the administrative segments for the artifact that contain various information including artifact properties. The access point for the user in an author or editor role is determined at step 2215 from access point list 2217 based on the artifact properties and the user. The modified artifact is processed at step 2220 to identify the portions of content for corresponding information model elements, and corresponding artifact segments are formed in accordance with the information model at step 2225 that collectively contain the modified artifact contents.

The number of segments formed is determined at step 2230. If the number of segments formed is greater than the number of access points in the access point list for the artifact as determined at step 2235 (e.g., additional content has been added that increased the number of segments), additional access points are generated by the artifact management system at step 2240 to cover the excess segments. The additional access points are determined based on file index record 1250 identifying records within the segment storage tables (e.g., as described above for FIG. 12) and the artifact segmentation, and access point list 2217 is updated with the additional access points at step 2245.

When the number of segments formed is less than the number of access points in the access point list for the artifact as determined at steps 2235 and 2250 (e.g., content has been removed that decreased the number of segments), the excess access points are released at step 2255, and access point list 2217 is updated to reflect the released access points at step 2260.

Once the number of segments is commensurate with the number of access points within access point list 2217 (e.g., as indicated by steps 2245 and 2260, and as determined from steps 2235 and 2250), a record is cleared (e.g., prior values within the record are erased or to set to null) at step 2265, and the access points (or access point list) for the artifact are stored in the cleared record. The order of the artifact segments is randomized at step 2270, while the order of the access points for the artifact are similarly randomized at step 2275. The contents of the segments are encrypted in accordance with the specified encryption levels and keys (e.g., as described above for FIG. 13) at step 2280, and the segments are stored as records randomly among the segment storage tables as described above at step 2285. The segment storage catalogue provides the available records for storage of the segments, and is updated in response to storage of the segments. In the case where the artifact contains less segments, the excess segments are released and the segment storage catalogue is updated to indicate availability of the released segments.

Figure 23:
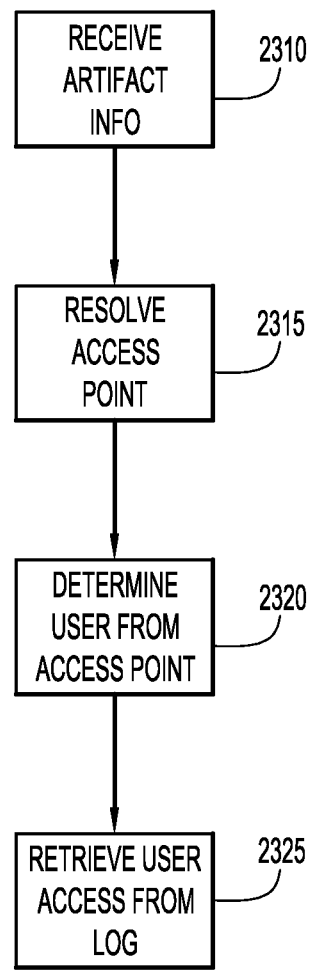
FIG. 23 is a flow diagram illustrating a manner of tracking access of an artifact according to an embodiment of the present invention.

A manner of tracking access of an artifact (e.g., via artifact manager module 120 and server system 100) is illustrated in FIG. 23. Initially, artifact information including an artifact identification and context level are received at step 2310 to specify a desired artifact for tracking access. The artifact identification, context level, and context identifier may be determined from information (e.g., artifact selection, context level selection, etc.) provided by a user via a user interface presented by a client system 114 (FIG. 1). The artifact identification and context identifier are utilized to retrieve the administrative segments for the artifact that contain various information including artifact properties and authorized access requests. The authorized access requests include the requestor or user and an access point identifier indicating the access point (e.g., as described above for FIG. 11). The access points for the specified artifact are determined from the information (e.g., access requests, etc.) within the administrative segments at step 2315. Since access points are bound to specific users as described above, the users corresponding to the artifact access points are further ascertained from the information (e.g., authorized access requests indicating the user or requestor and access point) within the administrative segments at step 2320. Artifact access log 2019 (e.g., FIG. 20) for the specified artifact is examined to determine the access points utilized to access the artifact and, hence, the corresponding users at step 2325. The determined accesses may be displayed on a user interface presented by a client system 114 (FIG. 1).

Alternatively, tracking of artifact access may be performed based on briar segments. A briar segment may include a statement (e.g., "This line left blank", "Intentionally left blank", "As stated earlier", etc.), or may further include long run-on sentences or groupings of words. These statements may be utilized to embed artifact access identifiers (e.g., including identifiers for access points) within an artifact as described above. For example, the information may be embedded within various portions of the underlying item represented by the artifact (e.g., header/footer, disclaimer line, document or other stamp, document identification, etc.). The briar segments are retrieved from the desired artifact, where the embedded information is utilized to determine an access point from which a user may be ascertained from information within the administrative segments as described above. The artifact access log for the specified artifact is examined to determine the user accesses of the artifact as described above.

It will be appreciated that the embodiments described above and illustrated in the drawings represent only a few of the many ways of implementing embodiments for managing digital information.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, artifact administration module, artifact manager module, etc.). These systems may include any types of monitors and input devices (e.g., keyboard, mouse, voice recognition, etc.) to enter and/or view information.

It is to be understood that the software (e.g., artifact administration module, artifact manager module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts (or flow diagrams) may be modified in any manner that accomplishes the functions described herein. In addition, the functions in the flow charts (or flow diagrams) or description may be performed in any order that accomplishes a desired operation.

The software of the present invention embodiments (e.g., artifact administration module, artifact manager module, etc.) may be available on a recordable or computer useable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g. wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., artifacts, artifact segments, administrative segments, briar segments, chaff segments, access points and lists, user information, tables, etc.). The database system may be implemented by any number of any conventional or other databases, data stores or storage structures (e.g., files, databases, data structures, data or other repositories, etc.) to store information (e.g., artifacts, artifact segments, administrative segments, briar segments, chaff segments, access points and lists, user information, tables, etc.). The database system may be included within or coupled to the server and/or client systems. The database systems and/or storage structures may be remote from or local to the computer or other processing systems, and may store any desired data (e.g., artifacts, artifact segments, administrative segments, briar segments, chaff segments, access points and lists, user information, tables, etc.). Further, the files and tables (e.g., segment storage, etc.) may be implemented by any conventional or other data structures (e.g., files, arrays, lists, stacks, queues, etc.) to store information, and may be stored in any desired storage unit (e.g., database, data or other repositories, etc.).

The present invention embodiments may manage any quantity of any artifacts, where an artifact may be any digital item, digital information, or collection of digital items or information (e.g., document, image, multimedia object, audio, video, etc.). The information model of an artifact may include any quantity of any types of elements arranged in any fashion and representing any corresponding portions of digital information (e.g., segments, identifiers, etc.). The elements may include any suitable relationships (e.g., one to one, one to many, etc.). The information model may be adapted for any items containing digital information (e.g., document, image, multimedia object, audio, video, etc.).

The artifact, administrative, briar, and chaff segments may be of any size or format, and contain any desired information. The administrative, briar, and chaff segments may be interleaved with artifact segments in any fashion, be separately stored, or be stored in any combination thereof. The administrative segments may be retrieved based on any desired information (e.g., artifact identification, context level or identifier, any artifact properties, etc.). The briar segments may include any desired information (e.g., text or statements, etc.) and embed any desired tracking information (e.g., access points, etc.) within any portion of the segment. Further, any desired chaff source (e.g., technical manual, open source, images, user-provided information, etc.) may be employed for the chaff segments.

The artifact segments may be stored and ordered in any desired fashion (e.g., random, sequential, patterns, etc.), and may be reconstituted based on any suitable ordering techniques (e.g., ascending, descending, etc.). The artifact and artifact segments may be associated with a corresponding sensitivity or context in any desired fashion, where the segments may be associated with same or different sensitivities. The random ordering for the segments and access points may be performed based on any random or pseudo-random functions. Alternatively, the ordering may be sequential or pattern-based. The various segments (e.g., artifact, administrative, briar, chaff, etc.) may be associated with any desired encryption/decryption techniques to protect artifact contents. Any portion or portions of the segments may be encrypted (e.g., content, properties, keys, etc.).

The artifact management system may employ any quantity of user groups or roles with any quantity of members providing any desired functionality (e.g., create, modify, review, view, store, copy, print, administrative, etc.). Artifact access may be tracked based on any desired criteria (e.g., access points, user identification, computers or machines requesting access, tracking access to a specific artifact, tracking access of artifacts by a user or user group, etc.).

The access point may include any quantity of any desired information (e.g., table name, file name, record number, address, etc.) and be arranged in any format to identify a storage location of a segment. The access points may be assigned to one or more users (e.g., individual user, user group, etc.) in order to facilitate tracking of access. The access points may be enabled for any desired time interval (e.g., hours, days, weeks, months, etc.).

The various identifiers (e.g., artifact, user, access point, file, context, etc.) may be of any size and format, and include any desired alphanumeric, numeric or other characters or symbols to identify a corresponding item (e.g., artifact, user, access point, file or table, context or sensitivity, etc.). The access requests may be of any size or arranged in any format, and include any desired information to request access to an artifact (e.g., artifact information, access point identifiers or access points, requestor, grantor, etc.).

The present invention embodiments may employ any number of any type of user interface (e.g., Graphical User Interface (GUI), command-line, prompt, etc.) for obtaining or providing information (e.g., artifact selection, users and corresponding roles, artifact properties or parameters, context selection, artifact access, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., artifact access, users and corresponding roles, artifact properties, etc.).

The present invention embodiments are not limited to the specific tasks or algorithms described above, but may be utilized for access control of any suitable digital or other item or object.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of providing secure access to a digital item comprising:
    partitioning, by a computer, the digital item into a plurality of segments each containing a portion of the digital item and a pointer to another segment of the digital item, and being associated with a corresponding sensitivity level;
    encrypting, by the computer, the portion of the digital item within each segment in accordance with the corresponding sensitivity level;
    randomly storing, by the computer, the plurality of segments among a plurality of storage units, and
    retrieving, by the computer, the plurality of segments from the plurality of storage units by utilizing the pointer within each segment to locate a next segment in sequence.

2. The computer implemented method of claim 1, wherein an access point indicates an initial segment to retrieve, and retrieving the plurality of segments further includes:
    retrieving the initial segment based on the access point.

3. The computer-implemented method of claim 2, further comprising:
    tracking access to the digital item based on the access points utilized to retrieve the plurality of segments.

4. The computer-implemented method of claim 1, wherein each segment includes a position identifier indicating an order for the plurality of segments to form the digital item, and the method further comprises:
    arranging the retrieved segments in accordance with the position identifier of each segment to form the digital item.

5. The computer-implemented method of claim 4, wherein a plurality of groups each include one or more members and are associated with corresponding operations for the digital item, and the method further comprises:
    enabling performance of operations on the digital item based on the group associated with a member.

6. The computer-implemented method of claim 1, further comprising:
 providing different versions of the digital item based on the corresponding sensitivity levels of the plurality of segments.

7. The computer-implemented method of claim 1, wherein the digital item is represented according to an information model specifying a structure for the digital item, the plurality of segments, and the sensitivity levels.

8. The computer-implemented method of claim 1, further comprising:
 storing one or more filler segments with extraneous information among the plurality of segments to obfuscate storage of the plurality of segments within the plurality of storage units.

* * * * *